US010963887B1

(12) United States Patent
Zigoris et al.

(10) Patent No.: US 10,963,887 B1
(45) Date of Patent: Mar. 30, 2021

(54) UTILIZING PROXY CONTACT INFORMATION FOR MERCHANT COMMUNICATIONS

(71) Applicant: Square, Inc., San Francisco, CA (US)

(72) Inventors: Philip Zigoris, San Francisco, CA (US); Tyler Kovacs, Oakland, CA (US)

(73) Assignee: Square, Inc., San Francisco, CA (US)

(*) Notice: Subject to any disclaimer, the term of this patent is extended or adjusted under 35 U.S.C. 154(b) by 45 days.

(21) Appl. No.: 15/365,902

(22) Filed: Nov. 30, 2016

(51) Int. Cl.
*G06Q 30/00* (2012.01)
*G06Q 20/20* (2012.01)
*G06Q 20/40* (2012.01)
*G06Q 30/02* (2012.01)

(52) U.S. Cl.
CPC ........... *G06Q 30/01* (2013.01); *G06Q 20/204* (2013.01); *G06Q 20/409* (2013.01); *G06Q 30/0277* (2013.01)

(58) Field of Classification Search
CPC .... G06Q 30/01; G06Q 20/204; G06Q 20/409; G06Q 30/0277
USPC .......................................................... 705/17
See application file for complete search history.

(56) References Cited

U.S. PATENT DOCUMENTS

| | | | |
|---|---|---|---|
| 6,003,013 A | 12/1999 | Boushy et al. | |
| 6,266,649 B1 | 7/2001 | Linden et al. | |
| 6,513,015 B2 | 1/2003 | Ogasawara | |
| 6,694,300 B1 | 2/2004 | Walker et al. | |
| 7,783,549 B1 | 8/2010 | Benson et al. | |
| 7,818,399 B1 | 10/2010 | Ross, Jr. et al. | |
| 7,962,361 B2 | 6/2011 | Ramchandani et al. | |
| 8,145,531 B1 | 3/2012 | Ptak et al. | |

(Continued)

FOREIGN PATENT DOCUMENTS

WO 01/37183 A1 5/2001

OTHER PUBLICATIONS

"Uber-Android Apps on Google Play," dated Nov. 10, 2014, Retrieved from the Internet URL: https://play.google.com/store/apps/details?id=com.ubercab&hl=en, on Nov. 12, 2014, pp. 1-2.

(Continued)

*Primary Examiner* — Luna Champagne
(74) *Attorney, Agent, or Firm* — Lee & Hayes, P.C.

(57) ABSTRACT

This disclosure describes, in part, techniques for utilizing proxy contact information in order to allow merchants to communicate with customers. For instance, a payment service may receive, from a first merchant device, payment information and first contact information for a customer during a first transaction. The payment service may then associate the payment information with the first contact information. Next, the payment service may receive the payment information from a second merchant device during a second transaction. Based on receiving the payment information, the payment service may identify the first contact information using the association between the payment information and the first contact information, generate second contact information for the customer, associated the second contact information with the first contact information, and send the second contact information to the second merchant device. The second merchant can use the second contact information to communicate with the customer.

20 Claims, 11 Drawing Sheets

(56) References Cited

U.S. PATENT DOCUMENTS

| | | |
|---|---|---|
| 8,175,908 B1 | 5/2012 | Anderson |
| 8,667,074 B1* | 3/2014 | Farkas .................. H04L 51/12 |
| | | 709/206 |
| 8,706,554 B1 | 4/2014 | Whitler |
| 8,712,855 B1 | 4/2014 | Weigman et al. |
| 9,619,831 B1 | 4/2017 | Kumar et al. |
| 9,767,471 B1 | 9/2017 | Perrone et al. |
| 9,916,562 B1 | 3/2018 | Armato |
| 10,290,016 B1 | 5/2019 | Rose |
| 10,740,822 B1 | 8/2020 | Bebawy et al. |
| 2002/0010617 A1 | 1/2002 | Hamaguchi et al. |
| 2002/0082920 A1 | 6/2002 | Austin et al. |
| 2002/0087384 A1 | 7/2002 | Neifeld |
| 2003/0009705 A1 | 1/2003 | Thelander et al. |
| 2003/0212601 A1 | 11/2003 | Silva et al. |
| 2005/0038706 A1 | 2/2005 | Yazdani et al. |
| 2005/0038893 A1 | 2/2005 | Graham |
| 2005/0246740 A1 | 11/2005 | Teraci et al. |
| 2005/0256782 A1 | 11/2005 | Sands et al. |
| 2006/0133317 A1 | 6/2006 | Hurtta |
| 2006/0253321 A1 | 11/2006 | Heywood |
| 2007/0179836 A1 | 8/2007 | Juang et al. |
| 2008/0103888 A1 | 5/2008 | Weir |
| 2008/0249837 A1 | 10/2008 | Angell et al. |
| 2009/0006188 A1 | 1/2009 | Guo et al. |
| 2009/0028183 A1 | 1/2009 | Landers et al. |
| 2009/0076898 A1 | 3/2009 | Wang et al. |
| 2009/0094237 A1 | 4/2009 | Churi et al. |
| 2009/0150193 A1 | 6/2009 | Hong et al. |
| 2009/0157472 A1 | 6/2009 | Burazin et al. |
| 2009/0271275 A1 | 10/2009 | Regmi et al. |
| 2010/0222036 A1 | 9/2010 | Wormald et al. |
| 2010/0228593 A1 | 9/2010 | Belwadi et al. |
| 2010/0274566 A1 | 10/2010 | Carlson |
| 2010/0274680 A1 | 10/2010 | Carlson et al. |
| 2010/0280880 A1 | 11/2010 | Faith et al. |
| 2011/0022463 A1 | 1/2011 | Harris |
| 2011/0035278 A1 | 2/2011 | Fordyce, III et al. |
| 2011/0035288 A1 | 2/2011 | Clyne |
| 2011/0082729 A1 | 4/2011 | Carvallo et al. |
| 2011/0106607 A1 | 5/2011 | Alfonso et al. |
| 2011/0119132 A1 | 5/2011 | Morton et al. |
| 2011/0125566 A1 | 5/2011 | McLaughlin et al. |
| 2011/0145628 A1 | 6/2011 | Wilson et al. |
| 2011/0191142 A1 | 8/2011 | Huang et al. |
| 2011/0231257 A1 | 9/2011 | Winters |
| 2011/0231305 A1 | 9/2011 | Winters |
| 2011/0231819 A1 | 9/2011 | Tanner et al. |
| 2011/0238474 A1 | 9/2011 | Carr et al. |
| 2011/0251888 A1 | 10/2011 | Faith et al. |
| 2011/0264501 A1 | 10/2011 | Clyne |
| 2011/0264581 A1 | 10/2011 | Clyne |
| 2011/0302016 A1 | 12/2011 | Haddad |
| 2012/0059911 A1 | 3/2012 | Randhawa et al. |
| 2012/0143700 A1 | 6/2012 | Bhattacharya et al. |
| 2012/0173427 A1 | 7/2012 | Sparks |
| 2012/0239504 A1 | 9/2012 | Curlander et al. |
| 2012/0271691 A1 | 10/2012 | Hammad et al. |
| 2012/0271715 A1 | 10/2012 | Morton et al. |
| 2012/0278139 A1 | 11/2012 | Mercuri et al. |
| 2012/0290349 A1 | 11/2012 | Burkhart et al. |
| 2012/0310838 A1 | 12/2012 | Harris et al. |
| 2013/0018785 A1* | 1/2013 | Dolphin ............. G06Q 20/3223 |
| | | 705/40 |
| 2013/0024307 A1 | 1/2013 | Fuerstenberg et al. |
| 2013/0030915 A1 | 1/2013 | Statler et al. |
| 2013/0031006 A1 | 1/2013 | McCullagh et al. |
| 2013/0046626 A1 | 2/2013 | Grigg et al. |
| 2013/0046717 A1 | 2/2013 | Grigg et al. |
| 2013/0124417 A1 | 5/2013 | Spears et al. |
| 2013/0132140 A1 | 5/2013 | Amin et al. |
| 2013/0132246 A1 | 5/2013 | Amin et al. |
| 2013/0132283 A1 | 5/2013 | Hayhow et al. |
| 2013/0132887 A1 | 5/2013 | Amin et al. |
| 2013/0159110 A1 | 6/2013 | Rajaram et al. |
| 2013/0246120 A1 | 9/2013 | Chang et al. |
| 2013/0246207 A1 | 9/2013 | Novak et al. |
| 2013/0246301 A1 | 9/2013 | Radhakrishnan et al. |
| 2013/0254008 A1 | 9/2013 | Ovick et al. |
| 2013/0262226 A1 | 10/2013 | LaChapelle et al. |
| 2013/0262295 A1 | 10/2013 | Narayanan |
| 2013/0262307 A1 | 10/2013 | Fasoli et al. |
| 2013/0275266 A1 | 10/2013 | Goff et al. |
| 2013/0346170 A1 | 12/2013 | Epstein et al. |
| 2014/0047101 A1 | 2/2014 | Nix et al. |
| 2014/0089133 A1 | 3/2014 | Argue et al. |
| 2014/0108256 A1 | 4/2014 | Bircher-Nagy et al. |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0156449 A1 | 6/2014 | Ganesan et al. |
| 2014/0172537 A1 | 6/2014 | Weigman |
| 2014/0214562 A1 | 7/2014 | Cancro et al. |
| 2014/0214572 A1 | 7/2014 | Cancro et al. |
| 2014/0229323 A1 | 8/2014 | Or et al. |
| 2014/0236669 A1 | 8/2014 | Milton et al. |
| 2014/0240725 A1 | 8/2014 | Banfield et al. |
| 2014/0278609 A1 | 9/2014 | Capps |
| 2014/0279015 A1 | 9/2014 | Root et al. |
| 2014/0344093 A1 | 11/2014 | Du et al. |
| 2014/0365301 A1 | 12/2014 | Rappoport et al. |
| 2015/0051994 A1 | 2/2015 | Ward et al. |
| 2015/0095219 A1 | 4/2015 | Hurley |
| 2015/0095228 A1 | 4/2015 | Su et al. |
| 2015/0120433 A1 | 4/2015 | Chaouki et al. |
| 2015/0142551 A1 | 5/2015 | Papakipos et al. |
| 2015/0170300 A1 | 6/2015 | Wilson et al. |
| 2015/0187021 A1* | 7/2015 | Moring ................ G06Q 40/12 |
| | | 705/17 |
| 2015/0206087 A1 | 7/2015 | Tavares |
| 2015/0220999 A1 | 8/2015 | Thornton et al. |
| 2015/0248694 A1 | 9/2015 | Chandra |
| 2015/0262221 A1 | 9/2015 | Nakano et al. |
| 2015/0269642 A1 | 9/2015 | Cai et al. |
| 2015/0287077 A1 | 10/2015 | Celikyilmaz et al. |
| 2015/0317681 A1 | 11/2015 | Zamer et al. |
| 2016/0012465 A1 | 1/2016 | Sharp |
| 2016/0042387 A1 | 2/2016 | Blackhurst et al. |
| 2016/0086217 A1 | 3/2016 | Loomis |
| 2016/0086257 A1 | 3/2016 | Collins et al. |
| 2016/0180393 A1 | 6/2016 | Mulye |
| 2016/0255040 A1* | 9/2016 | Howe .................... H04L 51/36 |
| | | 709/206 |
| 2016/0255044 A1* | 9/2016 | Howe .................... H04L 63/10 |
| | | 709/206 |
| 2017/0098286 A1 | 4/2017 | Gould et al. |
| 2017/0103392 A1* | 4/2017 | Moore .................. G06Q 20/02 |
| 2017/0169497 A1 | 6/2017 | Lee et al. |
| 2017/0228808 A1 | 8/2017 | Kumar et al. |
| 2017/0372345 A1 | 12/2017 | Shastry |
| 2019/0228431 A1 | 7/2019 | Rose |
| 2019/0228455 A1 | 7/2019 | Kumar et al. |
| 2020/0294089 A1 | 9/2020 | Wikman et al. |

OTHER PUBLICATIONS

Final Office Action dated Nov. 14, 2018, for U.S. Appl. No. 14/289,443, of Kumar, A., et al., filed May 28, 2014.

Non-Final Office Action dated Dec. 12, 2018, for U.S. Appl. No. 14/691,151, of Hartard, B., et al., filed Apr. 20, 2015.

Notice of Allowance dated Dec. 28, 2018, for U.S. Appl. No. 14/230,286, of Rose, C., filed Mar. 31, 2014.

Notice of Allowance dated Jan. 7, 2019, for U.S. Appl. No. 15/445,619, of Kumar, A., et al., filed Feb. 28, 2017.

Advisory Action dated Feb. 14, 2019, for U.S. Appl. No. 14/289,443, of Kumar, A., et al., filed May 28, 2014.

Non-Final Office Action dated Apr. 29, 2019, for U.S. Appl. No. 16/370,813, of Rose, C. filed Mar. 29, 2019.

Non-Final Office Action dated Jul. 29, 2019, for U.S. Appl. No. 15/383,891, of Bebawy, R., et al., filed Dec. 19, 2016.

Advisory Action dated Aug. 9, 2019, for U.S. Appl. No. 14/691,151, of Hartard, B., et al., filed Apr. 20, 2015.

(56) References Cited

OTHER PUBLICATIONS

Non-Final Office Action dated May 16, 2019, for U.S. Appl. No. 14/546,541, of Wikman, C.S., et al., filed Nov. 18, 2014.
Non-Final Office Action dated May 30, 2019, for U.S. Appl. No. 14/289,443, of Kumar, A., et al., filed May 28, 2014.
Final Office Action dated Jun. 3, 2019, for U.S. Appl. No. 14/691,151, of Hartard, B., et al., filed Apr. 20, 2015.
Advisory Action dated Aug. 24, 2018, for U.S. Appl. No. 13/682,488, of Dorogusker, J., filed Nov. 20, 2012.
Final Office Action dated Oct. 18, 2018, for U.S. Appl. No. 14/546,541, of Wikman, C.S., et al., filed Nov. 18, 2014.
Final Office Action dated Oct. 3, 2019, for U.S. Appl. No. 16/370,813, of Rose, C. filed Mar. 29, 2019.
Final Office Action dated Nov. 26, 2019, for U.S. Appl. No. 14/546,541, of Wikman, C.S., et al., filed Nov. 18, 2014.
Non-Final Office Action dated Jan. 2, 2020, for U.S. Appl. No. 14/691,151, of Hartard, B., et al., filed Apr. 20, 2015.
Non-Final Office Action dated Mar. 27, 2020, for U.S. Appl. No. 16/370,813, of Rose, C., filed Mar. 29, 2019.
Notice of Allowance dated Mar. 30, 2020, for U.S. Appl. No. 15/383,891, of Bebawy, R., et al., filed Dec. 19, 2016.
Final Office Action dated Apr. 15, 2020, for U.S. Appl. No. 14/691,151, of Hartard, B., et al., filed Apr. 20, 2015.
Final Office Action dated Jan. 3, 2020, for U.S. Appl. No. 15/383,891, of Bebawy, R., et al., filed Dec. 19, 2016.
Advisory Action dated Jan. 22, 2020, for U.S. Appl. No. 16/370,813, of Rose, C. filed Mar. 29, 2019.
Advisory Action dated Jan. 28, 2020, for U.S. Appl. No. 14/546,541, of Wikman, C.S., et al., filed Nov. 18, 2014.
Advisory Action dated Mar. 3, 2020, for U.S. Appl. No. 15/383,891, of Bebawy, R., et al., filed Dec. 19, 2016.
Non-Final Office Action dated Mar. 6, 2020, for U.S. Appl. No. 14/546,541, of Wikman, C.S., et al., filed Nov. 18, 2014.
Final Office Action dated Apr. 30, 2020, for U.S. Appl. No. 141289,443, of Kumar, A., et al., filed May 28, 2014.
Notice of Allowance dated Jun. 10, 2020, for U.S. Appl. No. 16/369,455, of Kumar, A., et al. filed Mar. 29, 2019.
Final Office Action dated Jul. 16, 2020, for U.S. Appl. No. 14/546,541, of Wikman, C.S., et al., filed Nov. 18, 2014.
Final Office Action dated Aug. 11, 2020, for U.S. Appl. No. 16/370,813, of Rose, C., filed Mar. 29, 2019.
Non-Final Office Action dated Feb. 21, 2014, for U.S. Appl. No. 13/682,488, of Dorogusker, J., filed Nov. 20, 2012.
Non-Final Office Action dated Jul. 16, 2014, for U.S. Appl. No. 13/682,488, of Dorogusker, J., filed Nov. 20, 2012.
Final Office Action dated Dec. 5, 2014, for U.S. Appl. No. 13/682,488, of Dorogusker, J., filed Nov. 20, 2012.
Non-Final Office Action dated Jul. 15, 2015, for U.S. Appl. No. 13/682,488, of Dorogusker, J., filed Nov. 20, 2012.
Non-Final Office Action dated Dec. 14, 2015, for U.S. Appl. No. 14/230,286, of Rose, C., filed Mar. 31, 2014.
Final Office Action dated Jan. 8, 2016, for U.S. Appl. No. 13/682,488, of Dorogusker, J., filed Nov. 20, 2012.
Final Office Action dated Jul. 21, 2016, for U.S. Appl. No. 14/230,286, of Rose, C., filed Mar. 31, 2014.
Non-Final Office Action dated Jul. 28, 2016, for U.S. Appl. No. 14/289,469, of Kumar, A., et al., filed May 28, 2014.
Non-Final Office Action dated Jul. 29, 2016, for U.S. Appl. No. 14/284,980, of Perrone, G., et al., filed May 22, 2014.
Non-Final Office Action dated Sep. 9, 2016, for U.S. Appl. No. 13/682,488, of Dorogusker, J., filed Nov. 20, 2012.
Non-Final Office Action dated Dec. 19, 2016, for U.S. Appl. No. 14/289,443, of Kumar, A., et al., filed May 28, 2014.
Final Office Action dated Dec. 21, 2016, for U.S. Appl. No. 14/284,980, of Perrone, G., et al., filed May 22, 2014.
Notice of Allowance dated Dec. 23, 2016, for U.S. Appl. No. 14/289,469, of Kumar, A., et al., filed May 28, 2014.
Final Office Action dated Dec. 28, 2016, for U.S. Appl. No. 13/682,488, of Dorogusker, J., filed Nov. 20, 2012.
Advisory Action dated Feb. 22, 2017, for U.S. Appl. No. 14/284,980, of Perrone, G., et al., filed May 22, 2014.
Non-Final Office Action dated Apr. 3, 2017, for U.S. Appl. No. 14/230,286, of Rose, C., filed Mar. 31, 2014.
Advisory Action dated Apr. 13, 2017, for U.S. Appl. No. 13/682,488, of Dorogusker, J., filed Nov. 20, 2012.
Advisory Action dated May 1, 2017, for U.S. Appl. No. 13/682,488, of Dorogusker, J., filed Nov. 20, 2012.
Notice of Allowance dated May 22, 2017, for U.S. Appl. No. 14/284,980, of Perrone, G., et al., filed May 22, 2014.
Non-Final Office Action dated Jun. 27, 2017, for U.S. Appl. No. 14/691,151, of Hartard, B., et al., filed Apr. 20, 2015.
Non-Final Office Action dated Jul. 27, 2017, for U.S. Appl. No. 14/546,541, of Wikman, C.S., et al., filed Nov. 18, 2014.
Final Office Action dated Sep. 22, 2017, for U.S. Appl. No. 14/230,286, of Rose, C., filed Mar. 31, 2014.
Final Rejection dated Dec. 6, 2017, for U.S. Appl. No. 14/289,443, of Kumar, A., et al., filed May 28, 2014.
Final Office Action dated Jan. 17, 2018, for U.S. Appl. No. 14/691,151, of Hartard, B., et al., filed Apr. 20, 2015.
Non-Final Office Action dated Feb. 1, 2018, for U.S. Appl. No. 13/682,488, of Dorogusker, J., filed Nov. 20, 2012.
Advisory Action dated Feb. 28, 2018, for U.S. Appl. No. 14/230,286, of Rose, C., filed Mar. 31, 2014.
Advisory Action dated Mar. 22, 2018, for U.S. Appl. No. 14/691,151, of Hartard, B., et al., filed Apr. 20, 2015.
Non-Final Office Action dated Apr. 4, 2018, for U.S. Appl. No. 14/289,443, of Kumar, A., et al., filed May 28, 2014.
Non-Final Office Action dated Jun. 8, 2018, for U.S. Appl. No. 14/230,286, of Rose, C., filed Mar. 31, 2014.
Final Office Action dated Jun. 13, 2018, for U.S. Appl. No. 13/682,488, of Dorogusker, J., filed Nov. 20, 2012.

* cited by examiner

UTILIZING PROXY CONTACT INFORMATION FOR MERCHANT COMMUNICATIONS

BACKGROUND

Merchants may conduct transactions for items and services with customers. To conduct a transaction with a customer, a merchant can use a point-of-sale (POS) device to receive payment from the customer, such as in the form of a payment instrument, and process payment instrument for a cost of the transaction using a payment service. The merchant can then use the POS device to generate a receipt for the customer. The receipt can include a digital receipt that the POS device sends the customer using contact information of the customer, such as an email address of the customer. The customer can provide the merchant with the contact information at a time of the transaction.

In some cases, a merchant may provide other merchants with the contact information. The other merchants can then use the contact information to send messages to the customer, such as advertisements or coupons for items or services provided by the other merchants. As such, the customer may not provide a merchant with the contact information during the transaction, as the customer may not want receive messages from other merchants. This can create problems for merchants that want to stay in contact with the customer after a respective transaction, such as through electronic messaging.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
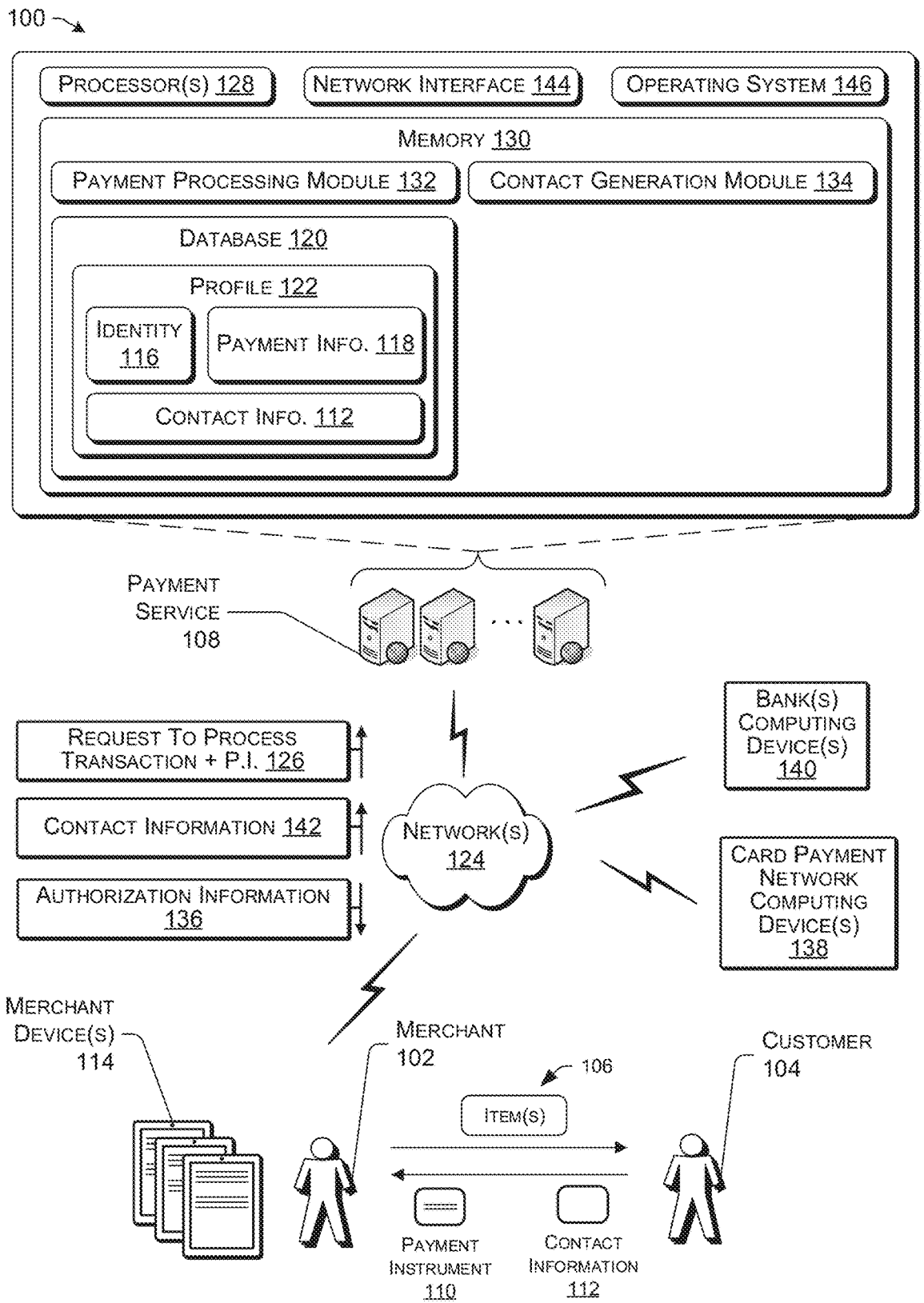
FIG. 1 illustrates an example environment that includes a first merchant conducting a transaction with a customer for item(s), as well as a payment service to authorize a payment instrument of the customer for the transaction. In this environment, the customer provides the first merchant with first contact information. The payment service receives the first contact information from the first merchant device(s) associated with the merchant, and stores payment information associated with the payment instrument and the first contact information in a database for the first merchant.

This disclosure describes, in part, techniques for utilizing proxy contact information in order to allow merchants to communicate with customers. For instance, a payment service can receive first transaction information from a first point-of-sale (POS) device associated with a first merchant. The first transaction information can describe a transaction between the first merchant and a customer. For instance, the first transaction information can indicate an identifier (e.g., name) of the customer, payment information of a payment instrument used by the customer during the transaction, item(s) acquired by the customer, a cost of the item(s) acquired by the customer, a time, place and date of the transaction, and so forth.

In addition to the first transaction information, the payment service can receive first contact information associated with the customer. The first contact information can include an email address, telephone number, home address, fax number, or any other type of contact information that can be used to contact the customer. In some instances, the payment service receives the first contact information from the first POS device. For instance, the payment service can receive the first contact information along with the first transaction information from the first POS device. In some instances, the payment service receives the first contact information from a device associated with the customer. The payment service can then store the first transaction information and the first contact information in association with a first profile of the customer.

For instance, the payment service can determine whether the customer has a first profile stored in a database associated with the first merchant. If the customer does not have a first profile, then the payment service can generate a first profile for the customer, and store the first profile in the database. The payment service can then store, in the database, the first transaction information and the first contact information for the customer in association with the first profile. In some instances, storing the information can include storing the payment information of the payment instrument and the first contact information in association with the first profile of the customer.

In addition to receiving the first transaction information, the payment service can receive second transaction information from a second POS device associated with a second merchant. The second transaction information can describe a transaction between the second merchant and the customer. For instance, the second transaction information can indicate the identifier (e.g., name) of the customer, the payment information of the payment instrument used by the customer during the transaction, item(s) acquired by the customer, a cost of the item(s) acquired by the customer, a time, place and date of the transaction, and so forth.

In some instances, unlike with the first transaction information, the payment service may not receive the first contact information associated with the customer from the second POS device. For example, the second merchant may not provide digital receipts to customers and as such, may not ask the customer for the first contact information. For another example, the customer may not want the second merchant to provide the first contact information to other merchants and/or third-party services that will use the first contact information to send messages, such as advertisements, to the customer. In either of the examples, the second merchant may still want to communicate with the customer after the transaction is complete.

In some instances, the payment service may provide the second merchant with the capability to communicate with the customer, while at the same time, refraining from providing the second merchant with the first contact information. For instance, the payment service may identify the first contact information stored in association with the first profile using the second transaction information. In some examples, to identify the first contact information, the payment services first identifies the first profile by matching the payment information from the second transaction information to the payment information that is stored in association with the first profile. Additionally, or alternatively, in some examples, the payment service identifies the payment information by matching the identifier of the customer from the second transaction information to the identifier of the customer that is stored in association with the first profile. In either of the examples, the payment service then identifies first contact information for the customer based on the association between the first profile and the first contact information.

In some instances, the payment service further generates second contact information for the customer. The second contact information can include a proxy email address, proxy telephone number, proxy home address, proxy fax number, or the like. For instance, the second contact information may be different than the first contact information, such that the second contact information obfuscates the first contact information. By obfuscating the first contact information, in some instances, the second merchant cannot determine the first contact information based on the second contact information. The payment service then creates an association between the second contact information and the first contact information. For instance, the payment service may store data that indicates that the second contact information includes proxy contact information for the first contact information.

In some instances, the payment services further stores the second transaction information and the second contact information in association with a second profile of the customer. For instance, the payment service can determine if a database associated with the second merchant includes a second profile for the customer. If the database does not include a second profile, then the payment service can generate the second profile for the customer. After generating the second profile, the payment service can store the second transaction information and the second contact information in association with the second profile of the user.

In some instances, the payment service can further send the second contact information to the second POS device in order to facilitate communication between the second merchant and the customer. In response, the second POS device can receive the second contact information, and then display the second contact information as an association with the customer to the second merchant. The second POS device can further store the second contact information locally for the second merchant. For instance, the second POS device can store, in a local database, the second contact information in association with an identifier of the customer. The second merchant can then use the second POS device to search for the second contact information when the second merchant wants to communicate with the customer.

Additionally to, or alternatively from, sending the second contact information, in some instances, the payment service can provide the second POS device with an application programming interface (API) that the second merchant can use to send messages that request to contact the customer using the second contact information. In such instances, the second POS device may not be required to store the second contact information locally. Rather, the merchant can use the API to send messages when the second merchant wants to communicate with the customer.

In some instances, the payment service can receive a first message from the second POS device (and/or another POS device associated with the second merchant) that requests to contact the customer using the second contact information. Based on receiving the first message, the payment service can analyze the first message to identity the second contact information and content of the first message. For instance, the payment service can utilize one or more algorithms, such as one or more algorithms associated with optical character recognition, to identify that the first message includes the second contact information and content. In some instances, the content can include advertisements and/or information associated with items or services provided by the second merchant.

The payment service can then identify the first contact information for the customer using the association between the second contact information and the first contact information. Using the first contact information, the payment service can send the customer a second message that includes the content of first message.

For instance, the payment service can produce a formatted communication corresponding to the first contact information, where the formatted communication includes content from the first message. The payment service can then send the formatted communication to the customer. For example, if the first contact information includes an email address, the payment service can produce and send the customer an email that includes the content using the email address. For another example, if the first contact information includes a phone number, the payment service can produce and send the customer a text message that includes the content using the phone number.

The customer can receive the second message from the payment service using a device, such as a personal computer, mobile phone, tablet, or other electronic device. The customer can then use the device to send message(s) to the second merchant. In some instances, sending message(s) to the second merchant includes sending the payment service a third message that requests to contact the second merchant. In such instances, the payment service can receive the third message, analyze the content of the third message to determine that the third message is directed to the second merchant, and send the second POS device a fourth message that includes content from the third message. For instance, the payment service can produce a formatted communication that includes content from the third message, and then send the formatted communication to the second POS device. Additionally, or alternatively, in some instances, sending the message(s) to the second merchant includes sending a third message directly from the device of the customer to the second POS device.

In some instances, the second merchant and the customer can continue communicating using the processes above. For instance, the payment service can receive one or more additional messages from the second POS device that request to contact the customer using the second contact information. The payment service can then send the customer one or more additional messages using the first contact information. Additionally, the payment service can receive one or more additional messages from the device of the customer requesting to contact the second merchant. The payment service can then send the second POS device one or more additional messages that include content from the customer.

In some instances, the payment service can block messages that request to contact the customer using the second contact information. For instance, as discussed above, the customer may not want to receive messages from merchants other than the second merchant. As such, the payment service may block messages that are received from other merchants, users, and/or third-party services that try to communicate with the customer using the second contact information.

For instance, the payment service may receive a first message from an electronic device that requests to contact the customer using the second contact information. The payment service can analyze the first message to determine that the first message is not sent from the second merchant. In some instances, the payment service can determine that the first message is not sent from the second merchant based on the electronic device not including the second POS device and/or another POS device associated with the second merchant. In some instances, the payment service can determine that the first message is not sent from the second merchant based on the content within the first message. For example, the payment service can analyze the content to determine that an identifier for a sender of the first message does not include the second merchant. For another example, the payment service can analyze the content to determine that items and/or services described within the first message are not provided by the second merchant.

Based on determining that the message is not sent from the second merchant, the payment service may refrain from sending the customer a second message that includes the content of first message using the first contact information. For instance, the payment service can refrain from formatting a communication that includes content of the first message. The payment service can further determine to block future messages that request to contact the customer using the second merchant device. In some instances, blocking future messages can even include blocking messages that are sent by the second merchant.

In some instances, the payment service can further block messages that request to contact the customer using the second contact information based on receiving a request from the customer. For instance, the payment service may receive a message from the device of the customer. The payment service may then analyze the message to determine that it is sent using the first contact information, and that the message includes an indication that the customer no longer wants to receive messages from the second merchant and/or no longer wants to receive messages that are sent using the second contact information. Based on receiving the message, the payment service can determine to block messages that request to contact the customer using the second contact information.

In some instances, the payment service may generate third contact information for the customer. The third contact information can include a new proxy email address, new proxy telephone number, new proxy address, new proxy fax number, or the like. In some instances, the third contact information is different than the first contact information and the second contact information. In some instances, the third contact information obfuscates the first contact information and the second contact information.

For instance, as discussed above, the payment service may block messages that request to contact the customer using the second contact information. In response, the payment service can generate the third contact information for the customer so that the second merchant can again communicate with the customer, using a similar process as above for the second contact information. For instance, the payment service can associate the third contact information with the first contact information. In some instances, the payment service can further store the third contact information in the second database in association with the second profile of the customer. The payment service can then send the second POS device the third contact information for communicating with the customer.

In some instances, the payment service may perform a similar process as described above for one or more additional merchants so that the one or more additional merchants can communicate with the customer. For instance, the payment service can receive third transaction information from a third POS device associated with a third merchant. The payment service can then generate third contact information for the customer, associate the third contact information with the first contact information, and store the third transaction information and the third contact information in a third database in association with a third profile of the customer. The payment service can then send the third POS device the third contact information so that the third merchant can communicate with the customer.

It should be noted that, the above describes that the payment service includes a separate database and separate profile associated the customer for each merchant. However, in some instances, the payment service may store transaction information from each merchant and/or contact information for the customer in a single database, or in two or more databases. Additionally, the payment service may store the transaction information and the contact information in association with a single profile associated with the customer, or in association with two or more profiles associated with the customer.

Additionally, in some instances, the payment service may provide the second contact information to one or more additional merchants (e.g., authorized merchants). For instance, the payment service may receive a message from a device of the customer that indicates that the payment service can provide the second contact information to additional merchant. In response, the payment service may send the second contact information to additional POS devices so that respective merchants can use the second contact information to communicate with the customer. In some instances, the payment service sends the second contact information to the additional POS devices based on the customer conducting respective transactions with the respective merchants.

Additionally, in some instances, the payment service may receive the first contact information and/or the payment information for the payment instrument from a device of the customer. For instance, the customer may use an application executing on the device that allows the customer to create a profile for the customer on the payment service. When creating the profile, the device to send the payment service the first contact information and/or the payment information. The payment service can then store the first contact information and/or the payment information in association with the profile.

By generating proxy contact information for merchants to communicate with the customer, the processes described above create a system in which merchants can use respective POS devices to communicate with customers without receiving actual contact information for the customers. This is advantageous to a merchant, as the merchant is not required to input contact information into the POS device in order to communicate with the customer. Rather, the payment service provides the POS device with the improved functionality to communicate with the customer based on the payment service merely receiving a request to process a transaction between the merchant and the customer. In other words, the payment service expands the technical capabilities of the POS device as the POS device is conducting transactions with customers, by providing the POS device with the enhanced capability to electronically communicate with customers after the transactions are complete.

Additionally, in some instances, the payment service provides the device of the customer with the capability to communicate with merchants of the customer's choosing without the risk of other merchants and/or third-parties receiving the actual contact information of the customer. For example, as described above, the device of the customer can send the payment service a message requesting to block messages that are received using the proxy contact information if the customer does not want to communicate with the merchant. The payment service can receive the message from the device, and block messages that are received using the proxy contact information in response. For another example, the payment service can analyze messages that request to contact the customer using the proxy contact information, and then block messages that the payment service determines are not sent from an authorized merchant (e.g., the merchant that the payment service sent the proxy contact information to), or the message includes content unrelated to marketing, promotional or transaction information (e.g., nonbusiness related personal message from merchant to customer).

As described herein, messages can include any type of electronic communication that electronic devices can send and receive with other electronic devices. For instance, a message can include an email message, a short message service (SMS), multimedia messages (MMS), a voicemail message, an audio signal, or any other type of electronic communication that an electronic device can send to another electronic device. In some instances, an electronic device may use messages to send indications, notifications, alerts, and/or requests to another electronic device.

FIG. 1 illustrates an example environment 100 that includes a first merchant 102 conducting a transaction with a customer 104 for item(s) 106, as well as a payment service 108 to authorize a payment instrument 110 of the customer 104 for the transaction. In this environment 100, the customer 104 further provides the first merchant 102 with contact information 112, such as an email address, phone number, home address, fax number, or the like. The payment service 108 receives the first contact information 112 from the first merchant device(s) 114 associated with the merchant 102, and stores an identity 116 of the customer 104, payment information 118 associated with the payment instrument 110, and the first contact information 112 in a database 120 in association with a first profile 122 of the customer 104.

For instance, and as illustrated in FIG. 1, the customer 104 may engage in a transaction with the first merchant 102 to obtain item(s) 106. During the transaction, the customer 104 may provide cash or the payment instrument 110 to the merchant 102, along with requests for item(s) 106 offered by the merchant 102. The merchant 102 may use the first merchant device(s) 114 (e.g., a POS device) for accepting payment from the customers 104.

As used in herein merchant device(s) may comprise any sort of mobile or non-mobile devices that include instances of a merchant application that executes on the respective devices. The merchant application may provide POS functionality to the merchant device(s) to enable merchants (e.g., owners, employees, etc.) to accept payments from the customers. In some types of businesses, the merchant device(s) may correspond to a store or other place of business of the merchants, and thus, may be a fixed location that typically does not change on a day-to-day basis. In other types of businesses, however, the location of the merchant device(s) may change from time to time, such as in the case that the merchants operate a food truck, is a street vendor, is a cab driver, etc., or has an otherwise mobile business, e.g., in the case the merchants sell items at buyer's homes, places of business, and so forth.

Additionally, as used herein, a merchant may include any business engaged in the offering of goods or services for acquisition by customers. Actions attributed to a merchant may include actions performed by owners, employees, or other agents of the merchant, and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires an item from a merchant, and in return, the customer provides payment to the merchant.

As used herein, a transaction, such as the transaction between the merchant 102 and the customer 104 in FIG. 1, may include a financial transaction for the acquisition of goods and/or services that is conducted between customers and merchants. For example, when paying for a transaction, the customer can provide the amount that is due to the merchant using cash or other payment instrument (e.g., a debit card, a credit card, a stored-value or gift card, a check, through an electronic payment application on a device carried by the customer, or the like). The merchant can interact with the merchant device(s) to process the transaction, such as by inputting (e.g., manually, using a magnetic card reader or an RFID reader, etc.) identifiers (e.g., payment information, such as a card number, account number, or any other account information) associated with the payment instrument. For example, a payment instrument of the customer may include one or more magnetic strips for providing card and customer information when swiped in a card reader. In other examples, the payment instrument may include other types of payment cards may be used, such as smart cards having a built-in memory chip that is read by the device when the card is "dipped" into the reader, a radiofrequency identification tag, or so forth.

During a transaction between a merchant and a customer, such as the transaction between the merchant 102 and the customer 104, the merchant device(s) can determine transaction information describing the transaction, such as the payment information of the payment instrument, an amount of payment received from the customer, the item(s) acquired by the customer, a time, place and date of the transaction, a card network associated with the payment instrument, an issuing bank of the payment instrument, a name of the customer, and so forth. The merchant device(s) can send the transaction information to the payment service 108 over a network 124, either substantially contemporaneously with the conducting of the transaction (in the case of online transactions) or later when the device is in the online mode (in the case offline transactions).

In an offline transaction, the merchant device(s), may store one or more characteristics associated with the transaction (i.e., the transaction information), such as a cost of the transaction, a time of day at which the transaction occurred, a day of the week at which the transaction occurred, a location at which the transaction took place, item(s) that the customer obtained, and the payment information of the payment instrument used in the transaction. After conducting an offline transaction with one of the customer, the merchant device(s) may provide the stored information (or some subset of it) to the payment service 108 over the network 124. The network 124 may represent any one or more wired or wireless networks, such as a WiFi network, a cellular network, or the like. In an online transaction, the first merchant device(s) 114 may send this information to the payment service 108 over the network 124 substantially contemporaneously with the transaction with the customer 104.

After the merchant receives the payment information from the customer, the merchant may use the merchant device(s) to send respective authorization requests, along with information regarding the transaction and payment information associated with payment instrument, to the payment service 108, which is represented by 126 for the transaction between the merchant 102 and the customer 104. The payment service 108 may include one or more processors 128 and memory 130, which may store a payment processing module 132, a contact generation module 134, and the first database 120 associated with the first merchant 102.

The payment processing module 132 may function to receive the information regarding the transaction from the first merchant device(s) 114 of the merchant 102 and attempt to authorize the payment instrument 110 used to conduct the transaction. The payment processing module 132 may then send an indication of whether the payment instrument 110 has been approved or declined back to the first merchant device(s) 114, as represented by 136.

Generally, when a customer and a merchant enter into an electronic payment transaction, such as the customer 104 and the merchant 102, the transaction is processed by electronically transferring funds from a financial account associated with the customer to a financial account associated with the merchant. As such, the payment processing module 132 may communicate with one or more computing devices of a card network (or "card payment network") 138, e.g., MasterCard®, VISA®, over the network 124 to conduct financial transactions electronically. The payment processing module 134 can also communicate with one or more computing devices of one or more banks 140, processing/acquiring services, or the like over the network 124. For example, the payment processing module 132 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

In the environment 100 of FIG. 1, in addition to the request to process the transaction, the first merchant device(s) 114 can further send the payment service 108 the first contact information 112 for the customer 104 over the network 124, as represented by 142. The payment service 108 can the store transaction information associated with the transaction, such as the payment information 118 associated with the payment instrument 110, and the first contact information 112 for the customer 104 in the database 120 in association with the first profile 122 of the customer 104. By storing the first contact information 112 in association with the first profile 122 of the customer 104, the first merchant 102 can communicate with the customer 104 after conducting the transaction.

For instance, the first merchant 102 can use the first merchant device(s) 114 to retrieve the first contact information 112 for the customer 104, and then use the first contact information 112 to send messages to the customer 104. In some instances, the first merchant device(s) 114 can retrieve the first contact information 112 by sending a message to the payment service 108 that requests the first contact information 112. In response, the payment service 108 can receive the message from the first merchant device(s) 114 and send the first contact information 112 back to the first merchant device(s) 114 in response. Additionally, or alternatively, in some instances, the first merchant device(s) 114 can retrieve the first contact information 112 by searching a local database that stores the first contact information 112 in association with an identity of the customer 104.

In the example of FIG. 1, the payment service 108 further includes network interface(s) 144. The network interface(s) 144, along with any other network interface(s) described herein, may include one or more interfaces and hardware components for enabling communication with various other devices over the network 124 or directly. For example, network interface(s) may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

As discussed herein, processor(s), such as processor(s) 128, may comprise one or more processors or processing cores. For example, the processor(s) can be implemented as one or more microprocessors, microcomputers, microcontrollers, digital signal processors, central processing units, state machines, logic circuitries, and/or any devices that manipulate signals based on operational instructions. In some cases, the processor(s) may be one or more hardware processors and/or logic circuits of any suitable type specifically programmed or configured to execute the algorithms and processes described herein. The processor(s) can be configured to fetch and execute computer-readable processor-executable instructions stored in the memory.

Additionally, as discussed herein, memory, such as memory 130, may be an example of tangible non-transitory computer storage media and may include volatile and non-volatile memory and/or removable and non-removable media implemented in any type of technology for storage of information such as computer-readable processor-executable instructions, data structures, program modules or other data. The memory may include, but is not limited to, RAM, ROM, EEPROM, flash memory, solid-state storage, magnetic disk storage, optical storage, and/or other computer-readable media technology. Further, in some cases, devices, such as merchant device(s), the payment service 108, a customer device, or the like, can access external storage, such as RAID storage systems, storage arrays, network attached storage, storage area networks, cloud storage, or any other medium that can be used to store information and that can be accessed by the processor(s) directly or through another computing device or network. Accordingly, the memory may be computer storage media able to store instructions, modules or components that may be executed by the processor(s). Further, when mentioned, non-transitory computer-readable media exclude media such as energy, carrier signals, electromagnetic waves, and signals per se.

Additional functional components of the payment service 108 may include an operating system 146 for controlling and managing various functions of the payment service 108 and for enabling basic user interactions with the payment service 108.

Figure 2:
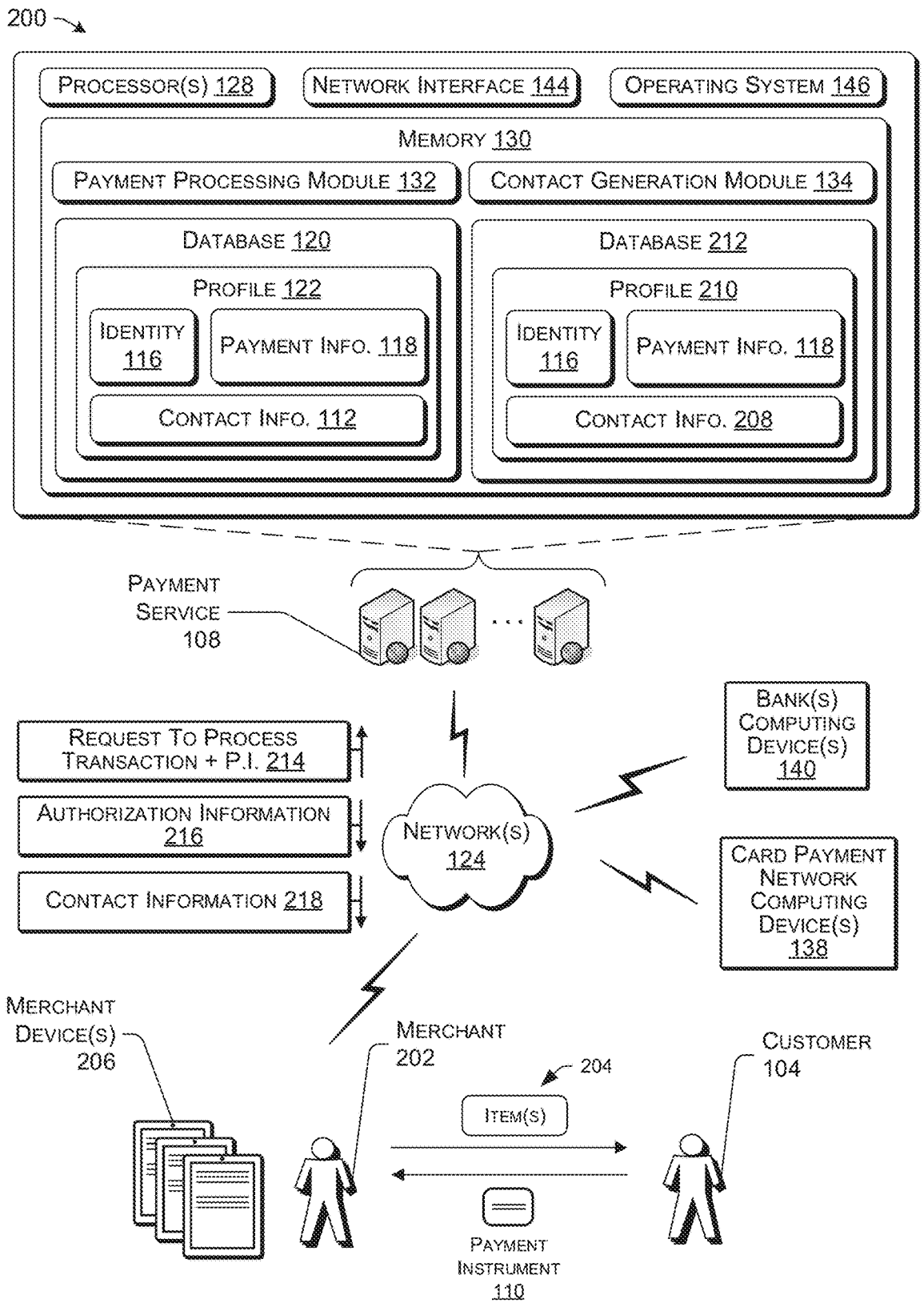
FIG. 2 illustrates an example environment that includes a second merchant conducting a transaction with the customer for item(s), as well as the payment service to authorize the payment instrument of the customer for the transaction. In this environment, the payment service uses the payment information received from the second merchant device(s) associated with the second merchant to identify the first contact information for the customer, generates second contact information for the customer, and then associated the second contact information with the first contact information. The payment service further stores the payment information and the second contact information in a database for the second merchant.

FIG. 2 illustrates an example environment 200 that includes a second merchant 202 conducting a transaction with the customer 104 for item(s) 204, as well as the payment service 108 to authorize the payment instrument 110 of the customer 104 for the transaction. During the transaction, which may occur after the transaction illustrated by the environment 100 of FIG. 1, the payment service 108 uses the payment information 110 received from the second merchant device(s) 206 associated with the second merchant 202 to identify the first contact information 112 for the customer 104, generates second contact information 208 for the customer 104, and then associates the second contact information 208 with the first contact information 112. The payment service 108 further stores, in association with a second profile 210 of the customer 104, the payment information 118 and the second contact information 208 in a database 212 associated with the second merchant 202.

For instance, and as illustrated in FIG. 2, the customers 104 may engage in the transaction with the second merchants 202 to obtain item(s) 204. The customers 104 may provide cash or the payment instrument 110 to the second merchant 202 along with requests for item(s) 204 offered by the second merchant 202. The second merchant 202 may use the second merchant device(s) 206 (e.g., a POS device) for accepting payment from the customers 104, using a similar process as described above for the first merchant device(s) 114.

For instance, the second merchant device(s) 206 may send an authorization request, along with information regarding the respective transaction and the payment information associated with the payment instrument 110, to the payment service 108, as represented by 214. The payment processing module 132 may function to receive the information regarding the transaction from the second merchant device(s) 206 of the merchant 202 and attempt to authorize the payment instrument 110 used to conduct the transaction, using a similar process as described in FIG. 1 for the transaction between the first merchant 102 and the customer 104. The payment processing module 132 may then send an indication of whether the payment instrument 110 has been approved or declined back to the second merchant device(s) 206, as represented by 216.

However, unlike the transaction illustrated in FIG. 1, the payment service 108 may not receive the first contact information 112 associated with the customer 104 from the second merchant device(s) 206. For example, the second merchant 202 may not provide digital receipts to customers and as such, may not ask the customer 104 for the first contact information 112. For another example, the customer 104 may not want the second merchant 202 to provide the first contact information 112 to other merchants and/or third-party services that will use the first contact information 112 to send messages, such as advertisements, to the customer 104. In either of the examples, the second merchant 202 may still want to communicate with the customer 104 after the transaction is complete.

In example of FIG. 2, the payment service 108 provides the second merchant 202 with the capability to communicate with the customer 104, while at the same time, refraining from providing the second merchant 202 with the first contact information 112. For instance, the payment service 108 may identify the first contact information 112 stored in association with the first profile 122 of the customer 104 using the transaction information received from the second merchant device(s) 206. In some examples, the payment services 108 first identifies the first profile 122 by matching the payment information received from second merchant device(s) 206 during the transaction with the payment information stored in associated with the first profile 122. In some examples, the payment service 108 identifies the first profile 122 by matching the identifier of the customer 104 received from the second merchant device(s) 206 with the identity 116 of the customer 104 that is stored in association with the first profile 122. In either of the examples, the payment service 108 then identifies the first contact information 112 using the association between the first contact information 112 and the first profile 122.

The payment service 108 further uses the contact generation module 134 to generate the second contact information 208 for the customer 104. The second contact information 208 can include a proxy email address, proxy telephone number, proxy address, proxy fax number, or the like. For instance, the second contact information 208 may be different than the first contact information 112, such that the second contact information 208 obfuscates the first contact information 112. In some instances, the contact generation module 134 generates the second contact information 208 using information associated with the customer 104, such as the identity 116 of the customer 104, the first contact information 112, the payment information 118, or the like. For instance, the contact generation module 134 can generate the second contact information 208 using one or more encryption algorithms that encrypt the first contact information 112, and/or one or more has functions that generate a hash of the first contact information 112.

In some instances, the contact generation module 134 generates the second contact information 208 without using information associated with the customer 104. For instance, the contact generation module 134 can generate completely random contact information for the customer 104. For instance, the contact generation module 134 can generate a random email address for the second contact information 208.

After generating the second contact information 208, the payment service 108 associates the second contact information 208 with the first contact information 112. For instance, the payment service 108 may store data that indicates that the second contact information 208 includes proxy contact information for the first contact information 112. In some instances, the payment service 108 may store the data in association with the second profile 210 of the customer 104.

The payment services 108 further stores transaction information (e.g., the payment information 118) and the second contact information 208 in association with the second profile 210 of the customer 104. For instance, the payment service 108 can determine whether the second database 212 associated with the second merchant 202 includes the second profile 210 for the customer 104. If the second database 212 does not include a second profile 210, then the payment service 108 can generate the second profile 210 for the customer 104. After generating the second profile 210, the payment service 108 can store, in the second database 212, the transaction information and the second contact information 208 in association with the second profile 210 of the customer 104.

The payment service further sends the second contact information 208 to the second merchant device(s) 206 in order to facilitate communication between the second merchant 202 and the customer 104, which is represented by 218. In response, the second merchant device(s) 206 can receive the second contact information 208, and then display the second contact information 208 as an association with the customer 104 to the second merchant 202. The second merchant device(s) 206 can further store the second contact information 208 locally for the second merchant 202. For instance, the second merchant device(s) 206 can store, in a local database, the second contact information 208 in association with an identifier of the customer 104. The second merchant 202 can then use the second merchant device(s) 206 to search for the second contact information 208 when the second merchant 202 wants to communicate with the customer 104.

In addition to sending the second contact information 208 to the merchant device(s) 206, in some instances, the payment service 108 can provide the second merchant device(s) 206 with an API that the second merchant 202 can use to send messages using the second contact information 208. In such instances, the second merchant device(s) 206 may not be required to store the second contact information 208 locally. Rather, the second merchant 202 can use the API to send communications to the customer 104.

Figure 3:
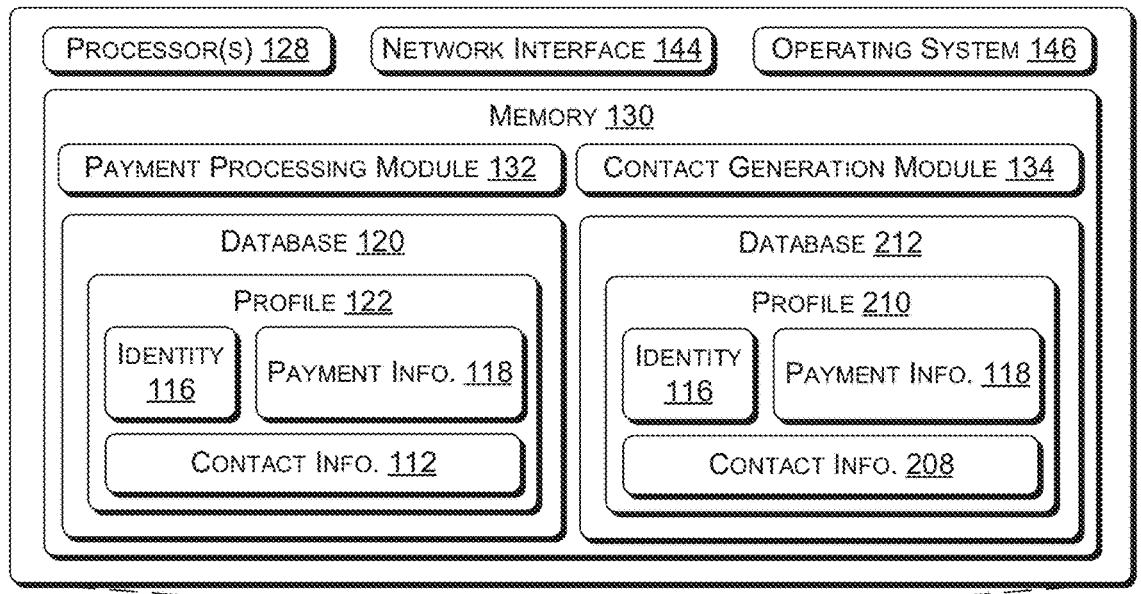
FIG. 3 illustrates an example environment that includes the second merchant using the second contact information to communicate with the customer. In this environment, the payment service receives a message from the second merchant device(s), where the message requests to contact the customer using the second contact information, and then sends a message to the customer on behalf of the second merchant using the first contact information. The payment service further receives a message from a customer device, and sends a message to the second merchant device(s) on behalf of the customer.
Figure 3:
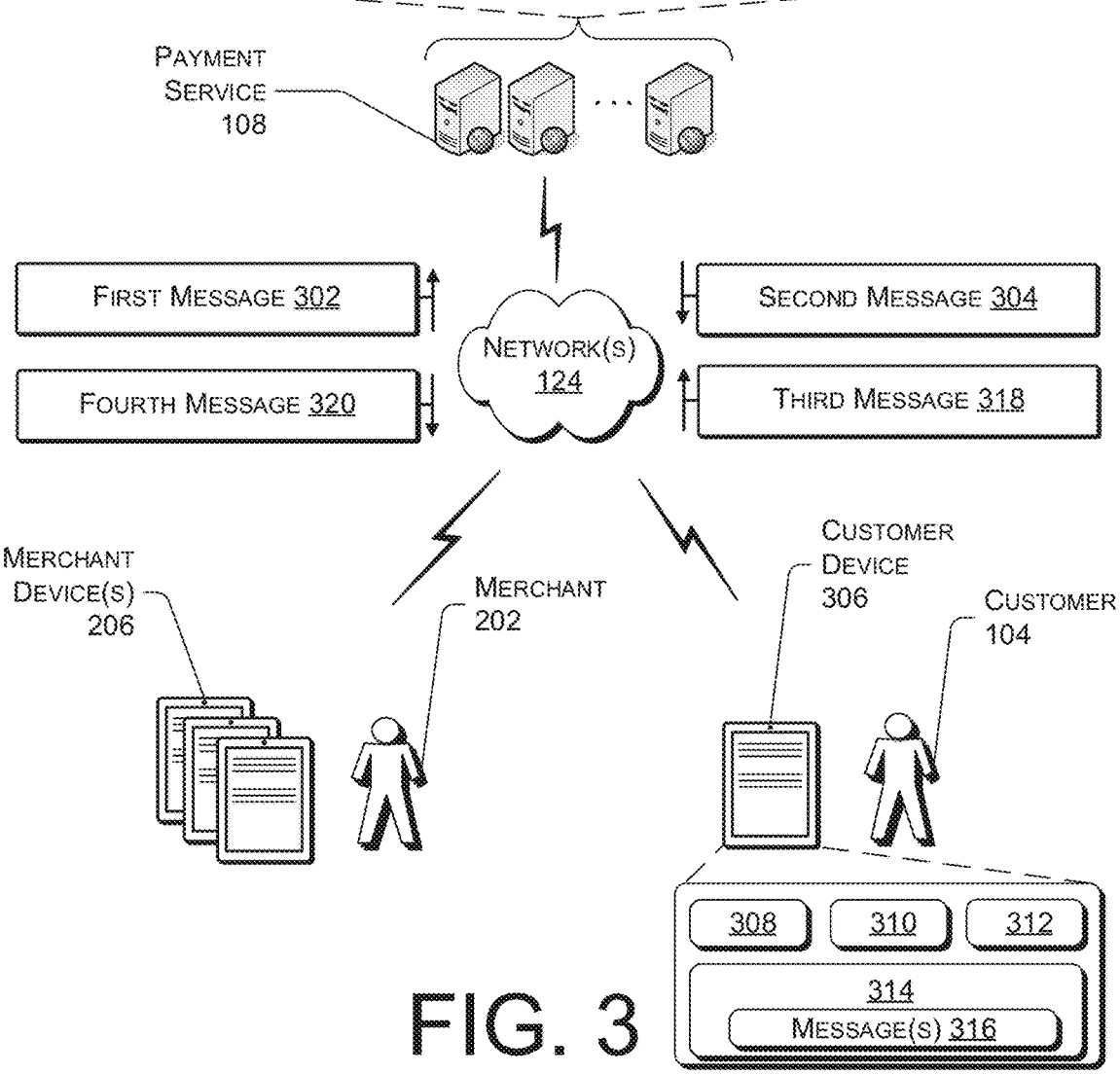

FIG. 3 illustrates an example environment 300 of the second merchant 202 using the second contact information 208 to communicate with the customer 104. For instance, the second merchant 202 may use the second merchant device(s) 206 to identify the second contact information 208 for the customer 104. In some instances, the second merchant 202 can identify the second contact information 208 by searching a directory stored on the second merchant device(s) 206.

The second merchant 202 can then use the second merchant device(s) 206 to send a first message to the payment service 108, which is represented by 302. The first message can include a request to contact the customer 104, using the second contact information 208, along with content for the customer 104. The payment service 108 can receive the first message from the second merchant device(s) 206 and, in response, analyze the first message to identify the second contact information 208 and the content. Based on identifying the second contact information 208, the payment service 108 can identify the first contact information 112 for the customer 104 using the association between the second contact information 208 and the first contact information 112.

The payment service 108 can further generate a second message for the customer 104 using the content of the first message, and send the second message to the customer 104 using the first contact information, which is represented by 304. For instance, the payment service 108 can produce a formatted communication corresponding to the first contact information 112, where the formatted communication includes content from the first message. The payment service 108 can then send the formatted communication to the customer 104.

For example, if the first contact information 112 includes an email address of the customer 104, the payment service 108 produce an email for the customer 104 that includes at least an identifier (e.g., name) of the second merchant 202 and the content from the first message. The payment service 108 can then send the email to the customer 104 using the first contact information 112. For another example, if the first contact information 112 includes a phone number, the payment service 108 can produce a text message for the customer 104 that includes at least an identifier (e.g., name) of the second merchant 202 and the content from the first message. The payment service 108 can then send the text message to the customer 104 using the first contact information 112.

As illustrated in FIG. 3, the customer 104 may include a customer device 306 that the customer 104 uses to send and receive messages with other entities, such as the payment service 108 and merchant device(s). The customer device 306 can include processor(s) 308, an operating system 310, network interface(s) 312, and a memory 314, which may store message(s) 316 sent and received from the customer device 306.

The customer 104 can use the customer device 306 to view the second message received from the payment service 108. Additionally, the customer 104 can use the customer device 306 to send one or more messages back to the second merchant 202. For instance, the customer 104 can send a third message to the payment service 108 that includes a request to contact the second merchant 202, which is represented by 318. In some instances, the customer device 306 sends the third message 318 using a similar type of communication channel as was used by the payment service 108 to send the customer 104 the second message. For instance, if the payment service 108 sent an email to the customer 104, then the third message can include an email sent from the customer device 306 to the payment service 108.

The payment service 108 can receive the third message from the customer device 306, and then analyze the third message to identity that the third message includes the request to contact the second merchant 202. Based on identifying the request, the payment service 108 can then generate a fourth message for the second merchant 202 that includes content from the third message, such as an identifier for the customer 104, text from the third message, or the like. The payment service 108 can then send the fourth message to the second merchant device(s) 206, which is represented by 320.

In some examples, the payment service 108 sends the fourth message to the second merchant device(s) 206 using a similar communication channel as the merchant device(s) 206 used to send the payment system 108 the first message. For instance, the payment service 108 may produce a formatted communication based on communications with the second merchant 202, where the formatted communication includes the content from the third message. The payment service 108 can then send the formatted communication to the second merchant device(s) 206.

In some instances, the second merchant 202 and the customer 104 can continue sending and receiving one or more messages with one another using such a process. For instance, the payment service 108 can receive one or more additional messages from the second merchant device(s) 206 that request to communicate with the customer 104 using the second contact information 208. The payment service 108 can then send the customer 104 one or more additional messages using the first contact information 112. Additionally, the payment service 108 can receive one or more additional messages from the customer device 306 requesting to contact the second merchant 202. The payment service 108 can then send the second merchant device(s) 206 one or more additional messages that include content from the customer 104.

Figure 4:
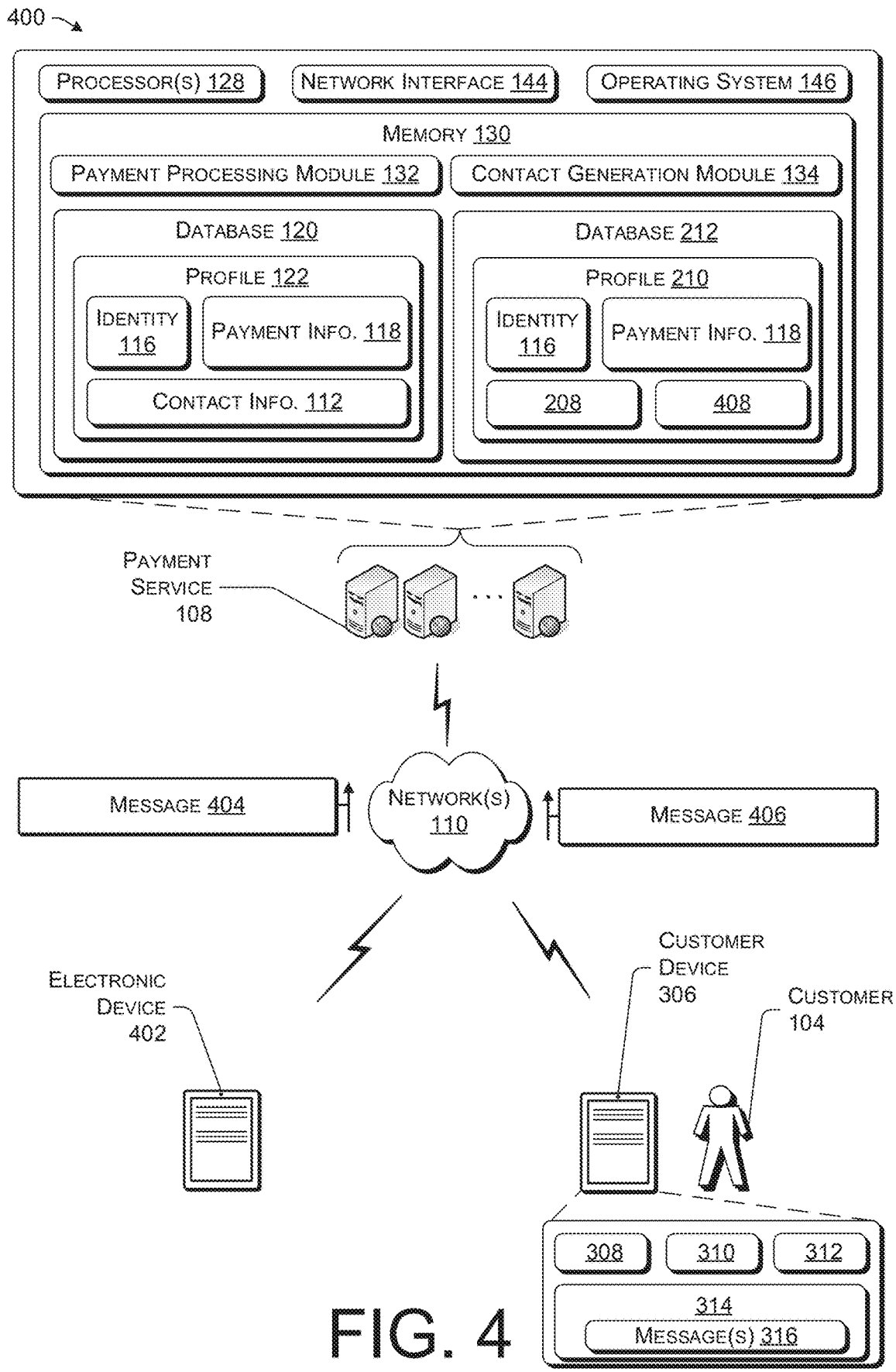
FIG. 4 illustrates an example environment that includes a payment service refraining from sending messages to the customer on behalf of merchants using the first contact information. In this environment, the payment service receives a message from an electronic device that requests to contact the customer using the second contact information. The payment service then determines that the message is not sent from the second merchant and in response, refrains from sending a message to the customer using the first contact information.

FIG. 4 illustrates an example environment 400 of the payment service 108 refraining from sending messages to the customer 104 on behalf of merchants using the second contact information 208. For instance, the payment service 108 may receive a message from an electronic device 402, as represented by 404. The payment service 108 can then analyze the message to identify that the message includes a request to contact the customer 104 using the second contact information 208. Additionally, the payment service 108 can analyze the message to determine that the message is not sent from the second merchant 202 (and/or another merchant authorized to use the second contact information).

In some instances, the payment service 108 can determine that the message is not sent from the second merchant 202 based on the electronic device not including one of the second merchant device(s) 206 associated with the second merchant 202. In some instances, the payment service 108 can determine that the message is not sent from the second merchant 202 based on the content within the message. For example, the payment service 108 can analyze the content within the message to determine that an identifier for a sender of the message does not include the second merchant 202. For another example, the payment service can analyze the content within the message to determine that the message describes items and/or services that are not provided by the second merchant 202.

Based on determining that the message is not sent from the second merchant 202, the payment service 108 can refrain from sending the customer 104 a message using the first contact information 112. For instance, the payment service 108 can refrain from generating a formatted message for the second merchant 202 that includes content from the message. Additionally, in some instances, the payment service 108 can determine to block any additional messages that include a request to contact the customer 104 using the second contact information 208. For example, the payment service 108 can cause it so that messages that includes a request to contact the customer 104 using the second contact information 208 are no longer received by the payment service 108.

As shown in FIG. 4, the payment service 108 further receives a message from the customer device 306, as represented by 406. The message may indicate that the customer 104 wants to block messages that are sent to the payment service 108 using the second contact information 208. Based on receiving the message, the payment service 108 may block messages requesting to contact the customer 104 using the second contact information 208.

For instance, the payment service 108 may analyze the message to determine that the message is sent using the first contact information. The payment service 108 may further analyze the message to determine that the message indicates that the customer 104 no longer wants to receive messages from the second merchant 202 and/or no longer wants to receive messages that include a request to contact the customer 104 using the second contact information 208. Based on receiving the message, the payment service 108 can determine to block messages that request to contact the customer 104 using the second contact information 208.

In some instances, the payment service 108 may use the contact generation module 134 to generate third contact information 408 for the customer 104. For instance, the payment service 108 may generate the third contact information 408 in response to blocking messages that the payment service 108 receives using the second contact information 208 so that the second merchant 202 can still communicate with the customer 104. After generating the third contact information 408, the payment service 108 can associated the third contact information 408 with the first contact information 112. The payment service 108 can further store, in the second database 212, the third contact information 408 in association with the second profile 210. Additionally, the payment service can send the third contact information 408 to the second merchant 202.

Figure 5A:
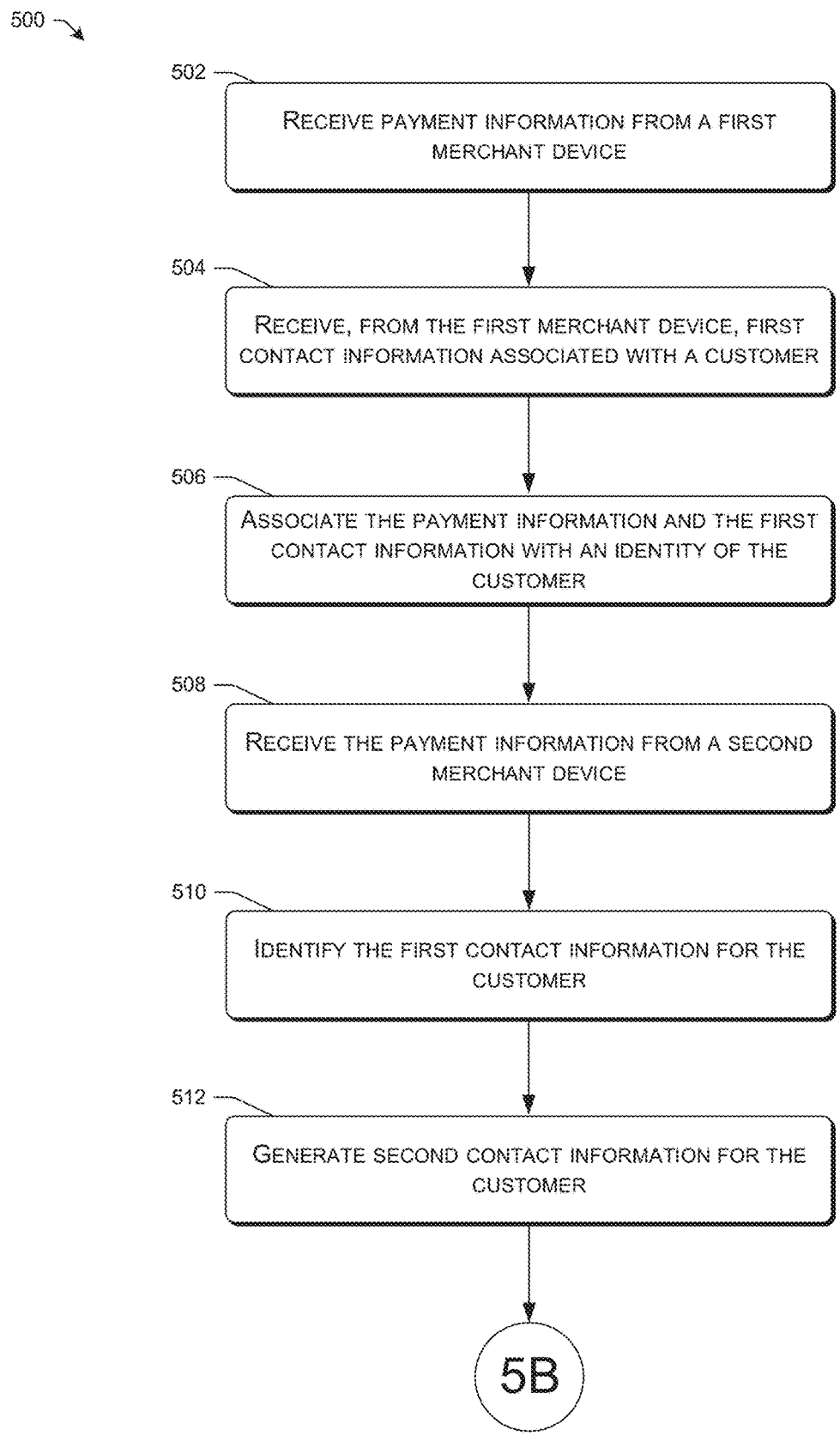
FIGS. 5A-5C illustrate a flow diagram of an example process for providing a merchant with proxy contact information so that the merchant can communicate with a customer. The process includes associating both payment information and first contact information received from a first merchant device with a profile of a customer. The process further includes receiving the payment information from a second merchant device, generating second contact information for the customer, associating the second contact information with the first contact information, and then sending the second contact information to the second merchant device. Additionally, the process includes receiving a first message requesting to contact the customer using the second contact information, and sending a second message to the customer using the first contact information.
Figure 5B:
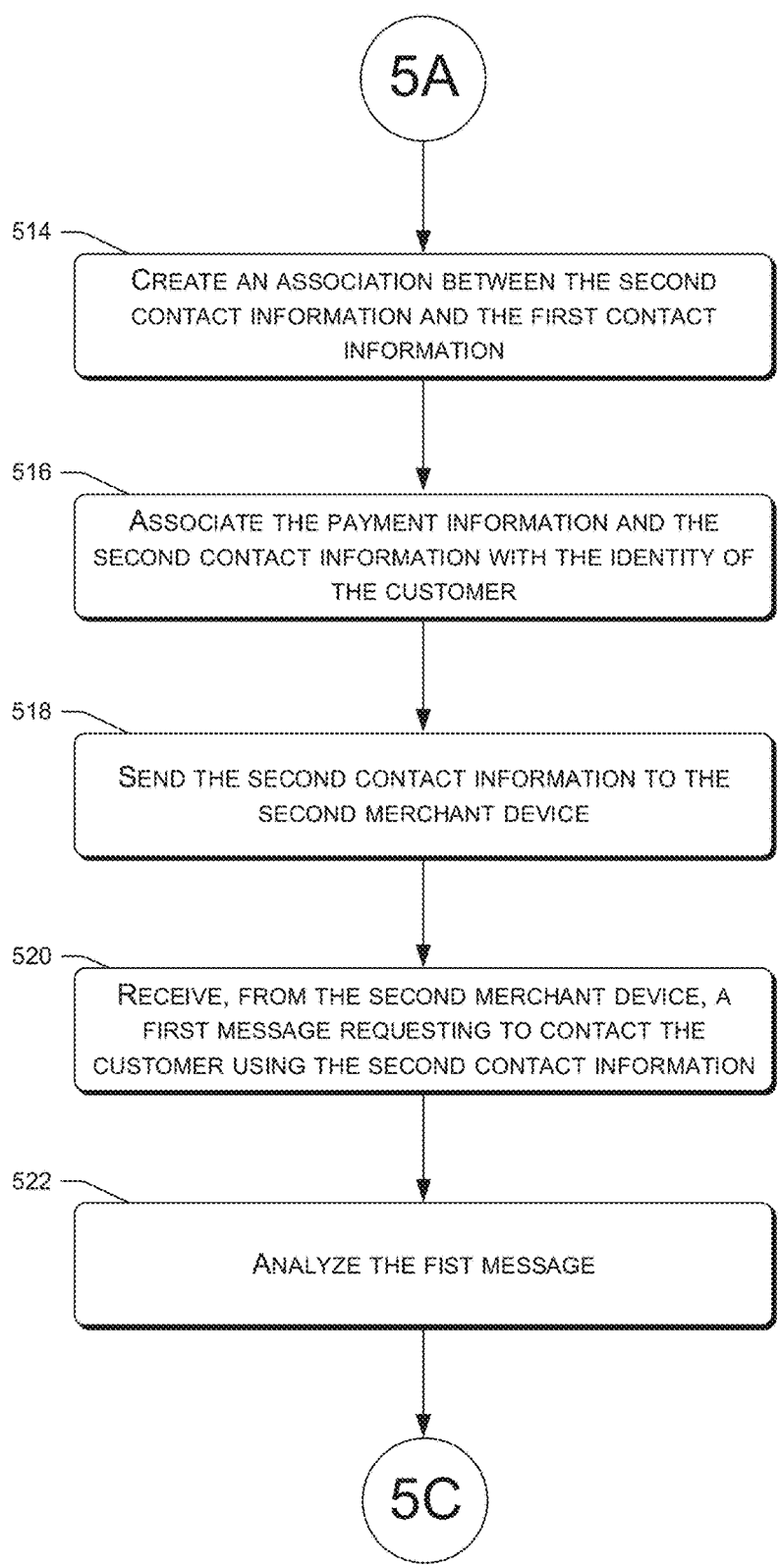

FIGS. 5A-5B are a flow diagram illustrating an example process 500 for providing a merchant with proxy contact information so that the merchant can communicate with a customer. The process 500, and other processes described herein, are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 500, and other processes described herein, may be performed by a payment service, a merchant device, a customer device, an additional electronic device, or by a combination thereof.

At 502, a payment service 108 receives payment information from a first merchant device. For instance, the payment service 108 may receive, from the first merchant device, a request to process a payment instrument for a first cost of a first transaction between a first merchant and a customer. The request may include payment information received by a card reader from the payment instrument. In some instances, based on receiving the request, the payment service 108 may use the payment information to attempt to authorize the payment instrument for the first cost of the first transaction.

At 504, the payment service 108 receives, from the first merchant device, first contact information associated with a customer. For instance, the payment service 108 may receive an email address, phone number, home address, fax number, or other type contact information associated with the customer. In some instances, the payment service 108 receives the contact information along with the request to process the first transaction.

At 506, the payment service 108 associates the payment information and the first contact information with an identity of the customer. For instance, the payment service 108 may store a first profile for the customer in a first database associated with the first merchant. The payment service 108 may then store, in the first database, the payment information and the first contact information in association with the first profile of the customer. In some examples, the first merchant can use the first contact information to communicate with the customer.

At 508, the payment service 108 receives the payment information from a second merchant device. For instance, after authorizing the first transaction, the payment service 108 may receive, from the second merchant device, a request to process the payment instrument for a second cost of a second transaction between a second merchant and the customer. The request may include the payment information received by a card reader from the payment instrument. In some instances, based on receiving the request, the payment service 108 may use the payment information to attempt to authorize the payment instrument for the second cost of the second transaction.

At 510, the payment service 108 identifies the first contact information for the customer. For instance, the payment service 108 may use the payment information received from the second merchant device to identify the first contact information for the customer. In some instances, to identify the first contact information, the payment service 108 first identifies the first profile for the customer by matching the payment information received from the second merchant device to the payment information stored in association with the first profile. The payment service 108 can then identify the first contact information based on the association between the first contact information and the first profile.

At 512, the payment service 512 generates second contact information for the customer. For instance, the payment service 108 may not receive the first contact information for the customer from the second merchant device and, in response, generate the second contact information so that the second merchant can communicate with the customer after the second transaction. In some instances, the second contact information is different than the first contact information and as such, obfuscates the first contact information. For instance, the second contact information can include a proxy email address, proxy phone number, proxy home address, proxy fax number, or the like.

For instance, if the first contact information for the customer includes an email address, the payment service 108 can generate a proxy email address for the customer. In some instances, to generate the proxy email address, the payment service 108 can one or more encryption algorithms to encrypt the email address. In some instances, to generate the proxy email address, the payment service 108 can use one or more hash functions to take a hash of the email address. Still, in some instances, the generate the proxy email address, the payment service 108 can generate a new email address that is not associated with the email address.

At 514, the payment service 108 creates an association between the second contact information and the first contact information. For instance, the payment service 108 may store data that indicates that the second contact information includes proxy contact information of the first contact information.

At 516, the payment service 108 associates the payment information and the second contact information with the identity of the customer. For instance, the payment service 108 may store a second profile for the customer in a second database associated with the second merchant. The payment service 108 may then store, in the second database, the payment information and the second contact information in association with the second profile of the customer. In some instances, the payment service 108 may further store, in the second database, the data that indicates that the second contact information includes proxy contact information of the first contact information.

At 518, the payment service 108 sends the second contact information to the second merchant device. For instance, the payment service 108 can send the second contact information to the second merchant device so that the second merchant can use the second contact information to communicate with the customer. In some instances, the second merchant device receives the second contact information and, in response, displays the second contact information in association with the customer to the second merchant.

At 520, the payment service 108 receives, from the second merchant device, a first message requesting to contact the customer using the second contact information. For instance, during and/or after the second transaction, the payment service 108 may receive the first message from the second merchant device. The second merchant device may send the first message using the second contact information. The first message may include content associated with the second merchant, such as advertisements and/or other information associated with items or services provided by the second merchant.

At 522, the payment service 108 analyzes the first message. For instance, the payment service 108 can analyze to the first message to identify at least the second contact information and content of the first message. In some instances, to analyze the first message, the payment service 108 can utilize one or more algorithms, such as one or more algorithms associated with optical character recognition, to identify that the first message includes the second contact information and the content associated with the second merchant.

In some instances, the payment service 108 further performs context analysis on the first message to determine whether the first message includes an appropriate business context for the customer. For instance, the payment service 108 determines whether the first message includes content regarding the second merchant, such as advertisements for items and/or services provided for by the second merchant. In some instances, the payment service 108 only performs the context analysis on messages that attempt to communicate with the customer using the second contact information. In some instances, the payment service 108 may block messages that do not include the appropriate business context.

At 524, the payment service 108 identifies the first contact information based at least in part on the association between the second contact information and the first contact information. For instance, based on analyzing the first message to identify that the first message includes the second contact information, the payment service 108 can use the stored data that associates the second contact information with the first contact information in order to identify the first contact information.

At 526, the payment service 108 sends a second message that includes content of the first message to the customer using the first contact information. For instance, the payment service 108 can generate a second message for the customer using at least an identity of the second merchant and the content from the first message. The payment service 108 can generate an appropriately formatted second message based on a type of contact information that the first contact information includes. For instance, if the first contact information includes an email address, the payment service can generate a communication in an email format that includes the identity of the second merchant and the content of the first message. The payment service 108 can then send the email to the customer using the email address. Similarly, the payment service may generate a communication in a text message format that includes the content of the first message if the first contact information includes a phone number. Furthermore, the payment service 108 may generate a communication in a website format in the event the first contact information is a blog post, website, social media, etc.

Figure 5C:
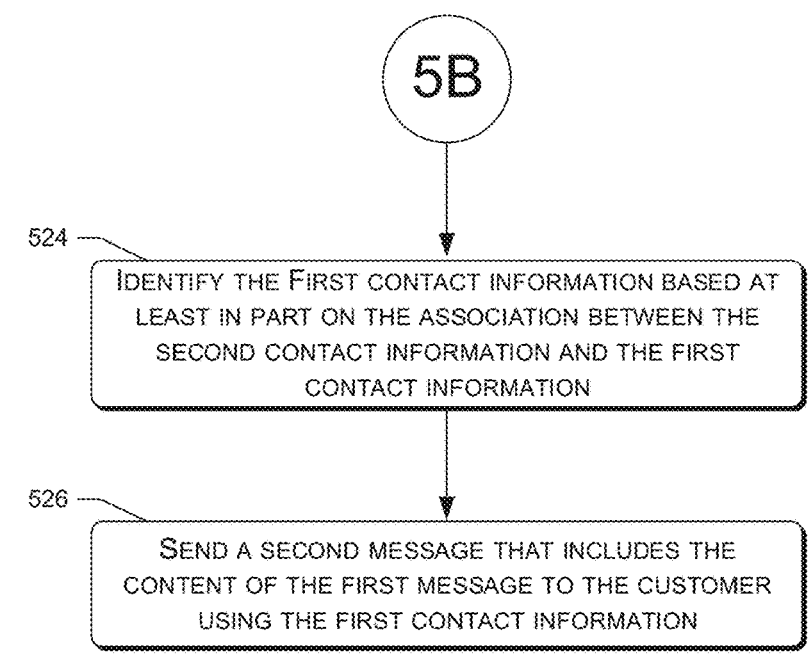
Figure 6:
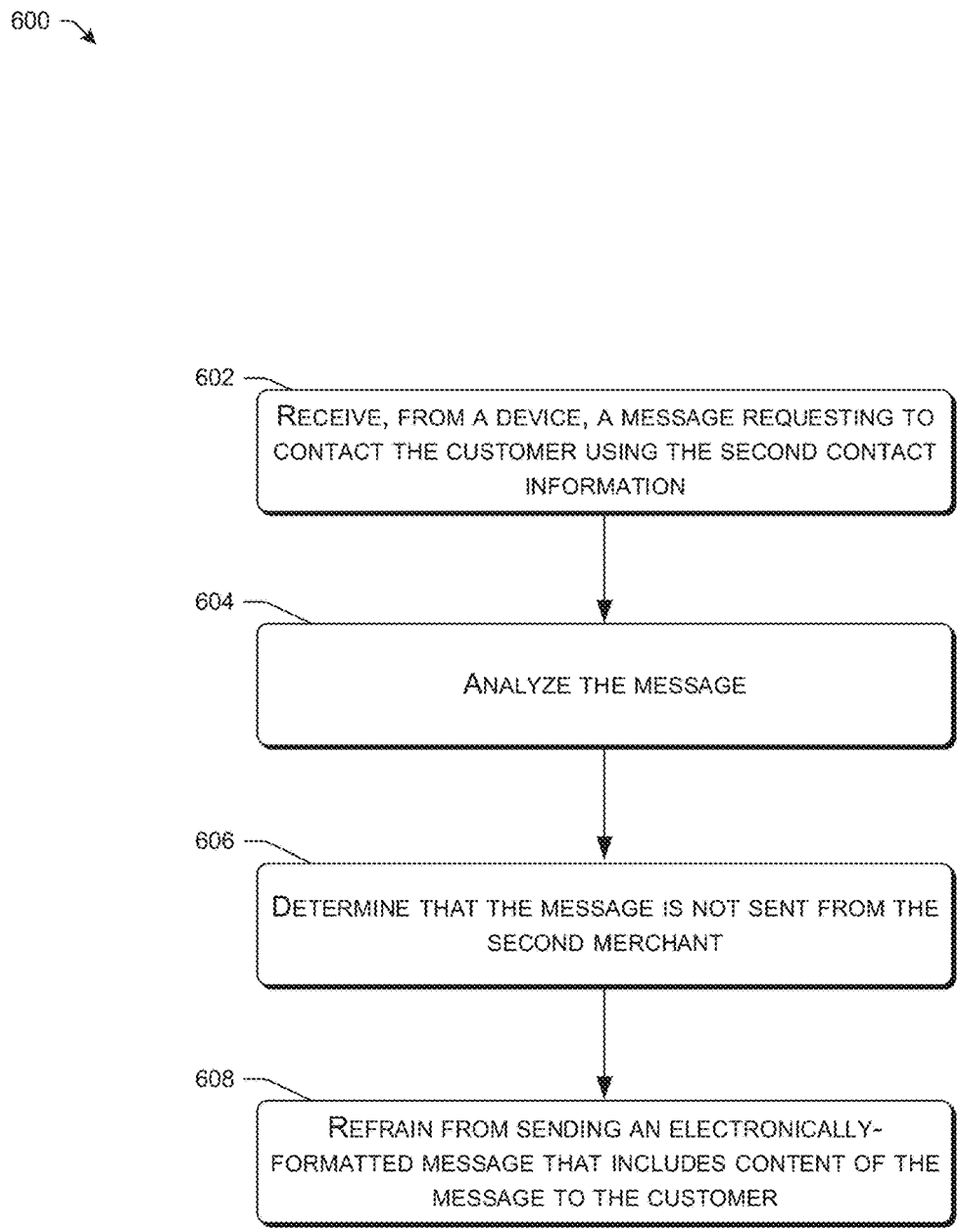
FIG. 6 illustrates a flow diagram of an example process for receiving a first message requesting to contact a customer using the second contact information, and refraining from sending a second message to the customer.

FIG. 6 illustrates a flow diagram of an example process 600 for receiving a message requesting to contact a customer using the second contact information, and refraining from sending a second message to the customer. The process 600 of FIG. 6 may occur any time after step 516 from the process 500 of FIG. 5. As such, the process 600 is described as a continuation of the process 500.

At 602, the payment service 108 receives, from a device, a message requesting to contact the customer using the second contact information. For instance, after associating the second contact information with the first contact information in step 516 of process 500 of FIG. 5, the payment service 108 may receive the message from a device. The message may include content associated with a merchant other than the second merchant, such as advertisements and/or other information associated with items or services provided by the other merchant.

At 604, the payment service 108 analyzes the message. For instance, the payment service 108 may analyze the message to determine an identity of a merchant that sent of the message. In some instances, to determine the identity, the payment service 108 may identify contact information associated with the merchant that sent the sent the message. In some instances, to determine the identity, the payment service may identity that content within the message is associated with a specific merchant. In such instances, the payment service 108 can identify the merchant based on the content.

In some instances, the payment service 108 further performs context analysis on the message to determine whether the message includes an appropriate business context for the customer. For instance, the payment service 108 determines whether the message includes content regarding the merchant, such as advertisements for items and/or services provided for by the merchant. In some instances, the payment service 108 only performs the context analysis on messages that attempt to communicate with the customer using the second contact information. In some instances, as discussed below, the payment service 108 may block messages that do not include the appropriate business context.

At 606, the payment service 108 determines that the message is not sent from the second merchant. For instance, payment service 108 can determine that the identity of the merchant that sent the message does not match the second merchant. Based on the determination, the payment service 108 can determine that the message is not sent from an authorized merchant (e.g., the second merchant).

At 608, the payment service 108 refrains from sending a an electronically-formatted message that includes content of the message to the customer. For instance, based on determining that the message is not sent from the second merchant, and/or that the message does not include the proper business context, the payment service 108 can determine to not send an electronically-formatted message to the customer using the first contact information. In some instances, the payment service 108 can further determine to block additional messages that the payment service 108 receives that request to contact the customer using the second contact information.

Figure 7:
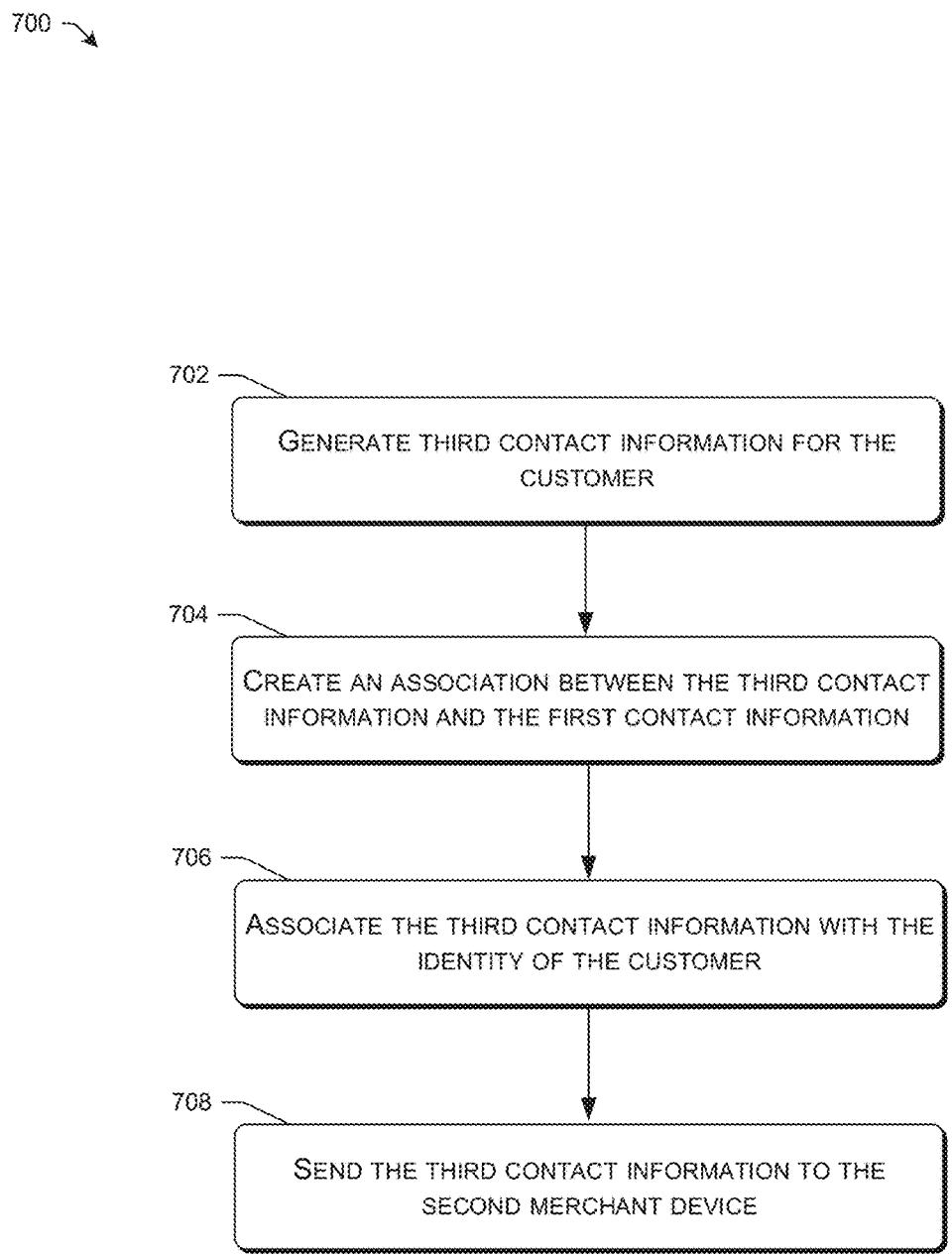
FIG. 7 illustrates a flow diagram of an example process for associating third contact information for the customer with the first contact information. The process includes generating the third contact information, associating the third contact information with the first contact information, and then sending the third contact information to the second merchant device.

FIG. 7 illustrates a flow diagram of an example process 700 for associating third contact information for the customer with the first contact information. The example process 700 of FIG. 7 may occur any time after step 516 from the example process 500 of FIG. 5. As such, the process 700 is described as a continuation of the process 500.

At 702, the payment service 108 generates third contact information for the customer. For instance, after determining to block messages that request to contact the customer using the first contact information, the payment service 108 can generate third contact information for the customer so that the second merchant can continue to communicate with the customer. In some instances, the third contact information is different than both the first contact information and the second contact information.

At 704, the payment service 108 creates an association between the third contact information and the first contact information. For instance, the payment service 108 may store data that indicates that the third contact information includes proxy contact information of the first contact information.

At 706, the payment service 108 associates the third contact information with the identity of the customer. For instance, the payment service 108 may store a second profile for the customer in a second database associated with the second merchant. The payment service 108 may then store, in the second database, the third contact information in association with the second profile of the customer. In some instances, the payment service 108 may further store, in the second database, the data that indicates that the third contact information includes proxy contact information of the first contact information.

At 708, the payment service 108 sends the third contact information to the second merchant device. For instance, the payment service 108 can send the third contact information to the second merchant device so that the second merchant can use the third contact information to communicate with the customer. In some instances, the second merchant device receives the third contact information and, in response, displays the third contact information in association with the customer to the second merchant.

Figure 8:
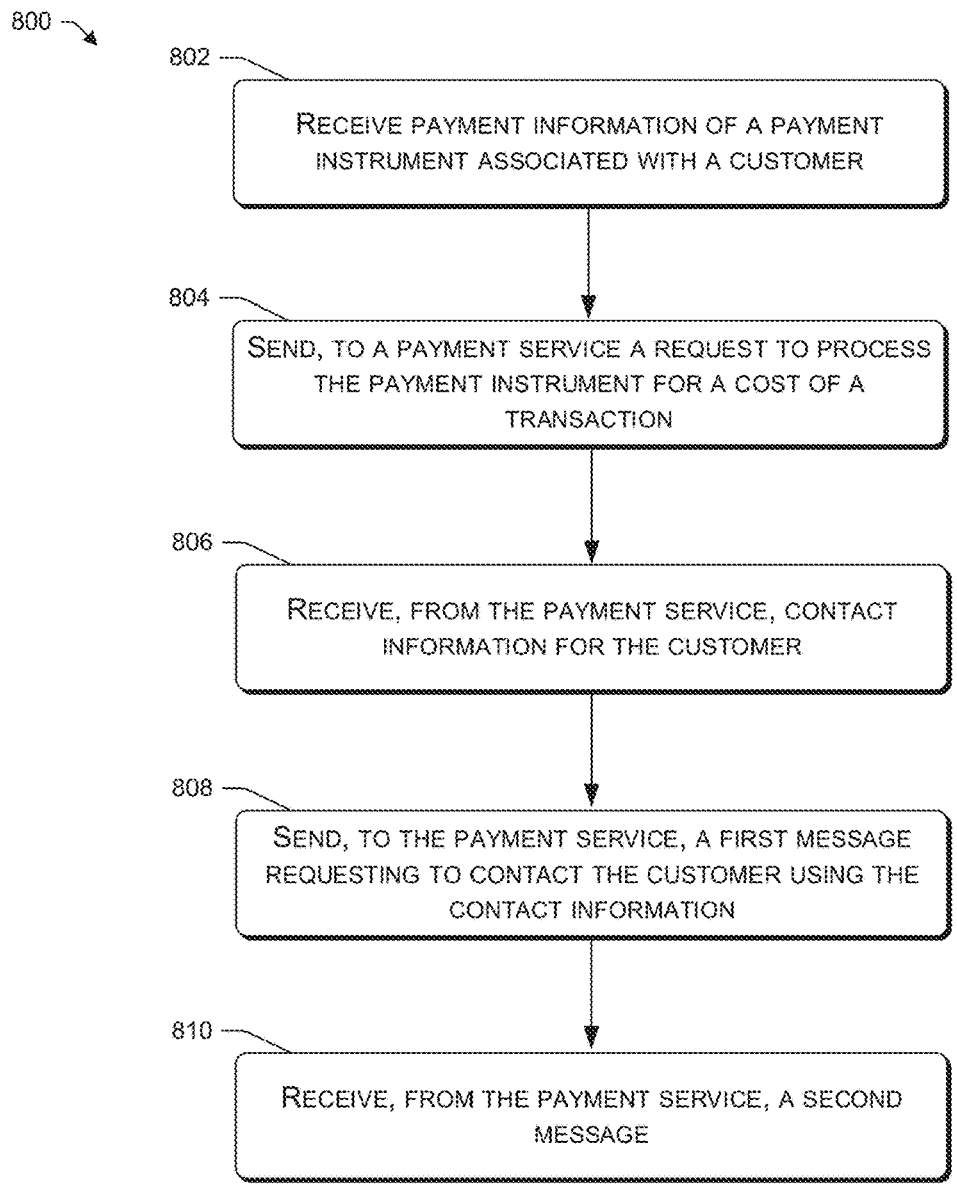
FIG. 8 illustrates a flow diagram of an example process for communicating with a customer using proxy contact information.

FIG. 8 illustrates a flow diagram of an example process for communicating with a customer using proxy contact information. At 802, a merchant device receives payment information of a payment instrument associated with a customer. For instance, a merchant associated with the merchant device may be conducting a transaction with a customer. During the transaction, the merchant device may receive the payment information from a card reader, where the card reader reads the payment information from the payment instrument.

At 804, the merchant device sends, to a payment service 108, a request to process the payment instrument for a cost of a transaction. For instance, based on receiving the payment information of the payment instrument, the merchant device can send, to the payment service 108, the request to process the payment instrument for the cost of the transaction between the merchant and the customer. In some instances, the merchant device can then receive, from the payment service 108, a message authorizing the payment instrument for the cost of the transaction.

At 806, the merchant device receives, from the payment service 108, contact information for the customer. For instance, based on sending the payment service 108 the request to process the payment instrument, the merchant device may receive the contact information for the customer from the payment service 108. In some instances, the contact information includes proxy contact information for the customer, which is associated with actual contact information of the customer. For instance, the contact information can include a proxy email address for the customer.

At 808, the merchant device sends, to the payment service 108, a first message requesting to contact the customer using the contact information. For instance, the merchant can use the merchant device to retrieve the contact information, such as from a local storage of the merchant device. The merchant can then use the merchant device to send a message that requests to contact the customer using the second contact information. In response, the merchant device can send the message to the payment service 108.

At 810, the merchant device receives, from the payment service 108, a second message. For instance, the customer may have used a customer device to send a message back to the payment service 108. In response, the payment service 108 may send an appropriately formatted message to the merchant device that includes content from the customer's message. The merchant device can then receive the message from the payment service 108, and display content associated with the message to the second merchant.

Figure 9:
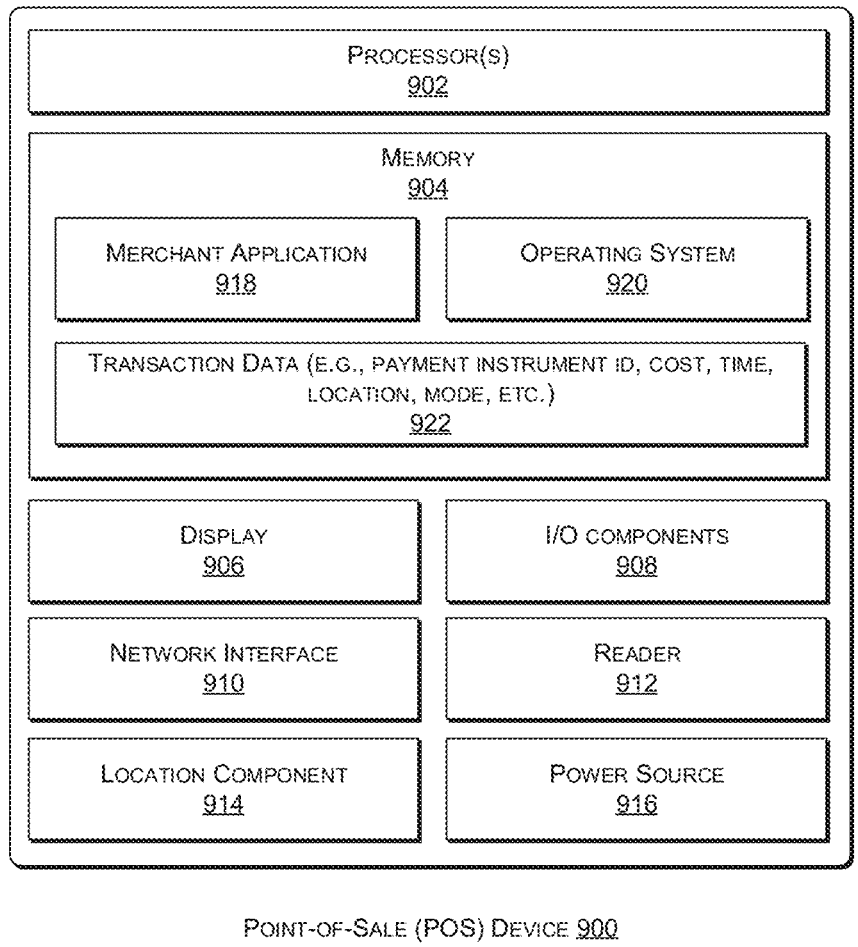
FIG. 9 illustrates select components of a merchant device that merchants described herein may utilize.

FIG. 9 illustrates select example components of an example POS device 900 according to some implementations. The POS device 900 may include any of the first merchant device(s) 114 or the second merchant device(s) 206. The POS device 900 may be any suitable type of computing device, e.g., mobile, semi-mobile, semi-stationary, or stationary. Some examples of the POS device 900 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 900 includes at least one processor 902, memory 904, a display 906, one or more input/output (I/O) components 908, one or more network interfaces 910, at least one card reader 912, at least one location component 914, and at least one power source 916. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the memory 904.

Depending on the configuration of the POS device 900, the memory 904 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 904 may include, but is not limited to, RAM, ROM, EEPROM, flash memory, solid-state storage, magnetic disk storage, optical storage, and/or other computer-readable media technology. Further, in some cases, the POS device 900 may access external storage, such as RAID storage systems, storage arrays, network attached storage, storage area networks, cloud storage, or any other medium that can be used to store information and that can be accessed by the processor 902 directly or through another computing device or network. Accordingly, the memory 904 may be computer storage media able to store instructions, modules or components that may be executed by the processor 902. Further, when mentioned, non-transitory computer-readable media exclude media such as energy, carrier signals, electromagnetic waves, and signals per se.

The memory 904 may be used to store and maintain any number of functional components that are executable by the processor 902. In some implementations, these functional components comprise instructions or programs that are executable by the processor 902 and that, when executed, implement operational logic for performing the actions and services attributed above to the POS device 900. Functional components of the POS device 900 stored in the memory 904 may include a merchant application 918, which may interact with applications executing on client devices to allow customers to pay for items offered by the merchant. The merchant application 918 may present an interface on the POS device 900 to enable the merchant to conduct transactions, receive payments, and so forth, as well as communicating with the payment service 108 for processing payments and sending transaction information. Further, the merchant application 918 may present an interface to enable the merchant to manage the merchant's account, and the like. Finally, the merchant application 918 may send data associated with the merchant to the payment service, and receive suggested gift card orders and values to associate with gift cards from the payment service.

Additional functional components may include an operating system 920 for controlling and managing various functions of the POS device 900 and for enabling basic user interactions with the POS device 900. The memory 904 may also store transaction data 922 that is received based on the merchant associated with the POS device 900 engaging in various transactions with customers, such as the example customer 104 from FIGS. 1-4. Additionally, the memory 904 may store contact information for customer, such as the customer 104.

In addition, the memory 904 may also store data, data structures and the like, that are used by the functional components. For example, this data may include item information that includes information about the items offered by the merchant, which may include images of the items, descriptions of the items, prices of the items, and so forth. Depending on the type of the POS device 900, the memory 904 may also optionally include other functional components and data, which may include programs, drivers, etc., and the data used or generated by the functional components. Further, the POS device 900 may include many other logical, programmatic and physical components, of which those described are merely examples that are related to the discussion herein.

The network interface(s) 910 may include one or more interfaces and hardware components for enabling communication with various other devices over the network or directly. For example, network interface(s) 910 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 9 further illustrates that the POS device 900 may include the display 906 mentioned above. Depending on the type of computing device used as the POS device 900, the display 906 may employ any suitable display technology. For example, the display 906 may be a liquid crystal display, a plasma display, a light emitting diode display, an OLED (organic light-emitting diode) display, an electronic paper display, or any other suitable type of display able to present digital content thereon. In some examples, the display 906 may have a touch sensor associated with the display 906 to provide a touchscreen display configured to receive touch inputs for enabling interaction with a graphic interface presented on the display 906. Accordingly, implementations herein are not limited to any particular display technology. Alternatively, in some examples, the POS device 900 may not include the display 906, and information may be present by other means, such as aurally.

The I/O components 908, meanwhile, may include speakers, a microphone, a camera, and various user controls (e.g., buttons, a joystick, a keyboard, a keypad, etc.), a haptic output device, and so forth. For instance, I/O components 908 can include a printing device for printing physical receipts for customers. In some examples, the POS device uses the printing device to print the physical receipts after receiving data representing the receipts from a payment service.

It should be noted that, in some examples, the I/O components 908 may be separate from the POS device 900. For instance, the printing device may be separate from the POS device 900. In some examples, the POS device 900 sends data representing the receipts to the printing device in order to cause the printing device to print physical receipts.

In addition, the POS device 900 may include or may be connectable to a payment instrument reader 912. In some examples, the reader 912 may plug in to a port in the merchant device, such as a microphone/headphone port, a data port, or other suitable port. In other instances, the reader 912 is integral with the entire POS device 900. The reader 912 may include a read head for reading a magnetic strip of a payment card, and further may include encryption technology for encrypting the information read from the magnetic strip. Alternatively, numerous other types of card readers may be employed with the POS devices 900 herein, depending on the type and configuration of a particular POS device 900.

The location component 914 may include a GPS device able to indicate location information, or the location component 914 may comprise another other location-based sensor. The POS device 900 may also include one or more additional sensors (not shown), such as an accelerometer, gyroscope, compass, proximity sensor, and the like. Additionally, the POS device 900 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
   one or more processors; and
   one or more computer-readable media storing instructions that, when executed by the one or more processors, cause the one or more processors to perform operations comprising:
   receiving, at one or more server computing devices associated with a payment service and from a first point-of-sale (POS) device associated with a first authorized merchant, a first request to process a first transaction between the first authorized merchant and a customer, the first request including at least first payment information received by a first instrument reader from a payment instrument;
   attempting to authorize the payment instrument for a first cost of the first transaction;
   receiving, at the one or more server computing devices associated with the payment service and from the first POS device, an email address associated with the customer;
   storing, by the one or more server computing devices associated with the payment service in a first database associated with the first authorized merchant, the first payment information and the email address in association with an identity of the customer;

receiving, at the one or more server computing devices associated with the payment service and from a second POS device associated with a second authorized merchant, a second request to process a second transaction between the second authorized merchant and the customer, the second authorized merchant being different than the first authorized merchant and the second request including at least second payment information received by a second instrument reader from the payment instrument, wherein the second payment information corresponds to the first payment information received by the first instrument reader;

attempting to authorize the payment instrument for a second cost of the second transaction;

identifying, by the one or more server computing devices associated with the payment service and using the second payment information received from the second request, the email address of the customer stored in the first database;

generating, by the one or more server computing devices associated with the payment service, a proxy email address for the customer, wherein the proxy email address is different than the email address and obfuscates the email address;

creating, by the one or more server computing devices associated with the payment service, an association between the proxy email address and the email address;

storing, by the one or more server computing devices associated with the payment service and in a second database associated with the second authorized merchant, the second payment information and the proxy email address in association with the identity of the customer, the second database being different than the first database;

providing, by the one or more server computing devices associated with the payment service for display on the second POS device, the proxy email address as an association with the customer;

receiving, at the one or more server computing devices associated with the payment service and from the second POS device, a message requesting to contact the customer using the proxy email address;

analyzing, by the one or more server computing devices associated with the payment service, the message to identify the proxy email address and content of the message;

based at least in part on analyzing the message, identifying, by the one or more server computing devices associated with the payment service, the email address of the customer using the association between the proxy email address and the email address;

producing, by the one or more server computing devices associated with the payment service, a formatted email communication that includes the content of the message; and sending, by the one or more server computing devices associated with the payment service and on behalf of the second authorized merchant, the formatted email communication to the customer using the email address.

2. The system as recited in claim 1, wherein the message comprises a first message, the operations further comprising:

receiving, from an electronic device, a second message requesting to contact the customer using the proxy email address;

analyzing content of the second message;

based at least in part on analyzing the content of the second message, determining that the second message is not sent from the second authorized merchant; and refraining from sending a formatted email communication that includes the content of the second message to the customer using the email address.

3. The system as recited in claim 1, wherein the proxy email address comprises a first proxy email address, and the operations further comprising:

determining to block messages that request to contact the customer using the first proxy email address;

generating a second proxy email address for the customer, wherein the second proxy email address is different than the first proxy email address;

creating an association between the second proxy email address and the email address;

storing, in the second database associated with the second authorized merchant, the second proxy email address in association with the identity of the customer; and providing, for display on the second POS device, the second proxy email address as an association with the customer.

4. The system as recited in claim 1, wherein the message comprises a first message, the operations further comprising:

receiving a second message requesting to contact the second authorized merchant;

analyzing the second message to identify an email address of a sender of the second message;

determining that the email address of the sender is the email address of the customer; and sending, on behalf of the customer, a formatted communication that includes content of the second message to the second POS device.

5. A method comprising:

receiving, by one or more computing devices associated with a payment service and from a first merchant device, first data indicating at least:
 payment information used to satisfy a cost of a first transaction between a first merchant and a customer; and
 first contact information for the customer;

storing, by the one or more computing devices associated with the payment service and in a first data structure associated with the payment service, an association between the first contact information, the payment information, and an identity of the customer;

receiving, by the one or more computing devices associated with the payment service and from a second merchant device, second data indicating at least the payment information, the payment information used to satisfy a cost of a second transaction between a second merchant and the customer, the second merchant being a different merchant than the first merchant;

identifying, by the one or more computing devices associated with the payment service, the first contact information based on the second data including the payment information used to satisfy the cost of the second transaction between the second merchant and the customer;

generating, by the one or more computing devices associated with the payment service, second contact information for the customer;

storing, by the one or more computing devices associated with the payment service and in a second data structure associated with the payment service, an association between the second contact information, the payment information, and the identity of the customer, the second data structure being different than the first data structure;

creating, by the one or more computing devices associated with the payment service, an association between the second contact information and the first contact information; and providing, by the one or more computing devices associated with the payment service to the second merchant device, an application programming interface (API) to facilitate communication between the second merchant and the customer using the second contact information.

6. The method as recited in claim 5, further comprising:
receiving, from the second merchant device, via the API, a message requesting to contact the customer using the second contact information;
analyzing the message to identify the second contact information and content of the message;
based at least in part on analyzing the message, identifying the first contact information using the association between the second contact information and the first contact information;
producing a formatted communication corresponding to the first contact information and including the content of the message; and
sending, on behalf of the second merchant, the formatted communication to the customer using the first contact information.

7. The method as recited in claim 5, further comprising:
receiving, from an electronic device, a message requesting to contact the customer using the second contact information;
analyzing content of the message;
based at least in part on analyzing the content of the message, determining that the message is not sent from the second merchant; and
refraining from sending a formatted communication that includes the content of the message to the customer using the first contact information.

8. The method as recited in claim 5, further comprising:
determining to block messages requesting to contact the customer using the second contact information;
generating third contact information for the customer, wherein the third contact information is different than the second contact information;
creating, by the one or more computing devices associated with the payment service, an association between the third contact information and the first contact information; and
using the API to facilitate communication between the second merchant and the customer using the third contact information.

9. The method as recited in claim 5, further comprising:
receiving a message from a customer device;
analyzing the message to identity the first contact information;
analyzing content of the message to determine that the customer no longer wants to receive messages from the second merchant; and
determining to block messages requesting to contact the customer using the second contact information.

10. The method as recited in claim 5, wherein the first contact information includes an email address and the second contact information includes a proxy email address.

11. The method as recited in claim 5, further comprising:
receiving, from a third merchant device, third data indicating at least the payment information, wherein the payment information is used to satisfy a cost of a third transaction between a third merchant and the customer, the third merchant being different than the first merchant and different than the second merchant;
based on the payment information used to satisfy the cost of the third transaction between the third merchant and the customer, identifying the first contact information;
generating third contact information for the customer;
creating an association between the third contact information and the first contact information; and
sending, to the third merchant device, the third contact information for facilitating communication between the customer and the third merchant.

12. A system comprising:
one or more processors; and
one or more computer-readable media storing instructions that, when executed by the one or more processors, cause the one or more processors to perform operations comprising:
receiving, by one or more server computing devices associated with a payment service, first contact information associated with a customer;
receiving, by the one or more server computing devices associated with the payment service and from a first merchant device associated with a first merchant, payment information associated with a payment instrument of the customer, the payment instrument used to conduct a transaction between the first merchant and the customer;
storing, by the one or more server computing devices associated with the payment service and in a first data structure associated with the payment service, a first association between the first contact information and the payment information;
receiving, at the one or more server computing devices associated with the payment service and from a second merchant device associated with a second merchant, a request to authorize the payment instrument for a cost of a transaction between the second merchant and the customer, the request including at least the payment information, the second merchant being different than the first merchant;
based at least in part on receiving the request that includes the payment information:
identifying, by the one or more server computing devices associated with the payment service, the first contact information using the payment information from the request; and
generating, by the one or more server computing devices associated with the payment service, second contact information for the customer;
storing, by the one or more computing devices associated with the payment service and in a second data structure associated with the payment service, a second association between the second contact information, the payment information and the identity of the customer, the second data structure being different than the first data structure;
creating, by the one or more server computing devices associated with the payment service, a third association between the second contact information and the first contact information; and providing, by the one or more computing devices associated with the payment service to the second merchant device, an application programming interface (API) to facilitate communication between the second merchant and the customer using the second contact information.

13. The system as recited in claim 12, the operations further comprising:

receiving, from the second merchant device via the API, a message requesting to contact the customer using the second contact information;

identifying the first contact information using the third association between the second contact information and the first contact information;

analyzing the message to identify content of the message;

producing a formatted communication corresponding to the first contact information and including the content of the message; and sending, on behalf of the second merchant, the formatted communication to the customer using the first contact information.

14. The system as recited in claim 12, the operations further comprising:

receiving, from an electronic device, a message requesting to contact the customer using the second contact information;

analyzing content of the message;

based at least in part on analyzing the content of the message, determining that the message is not sent from the second merchant associated with the second merchant device; and refraining from sending a formatted communication that includes the content of the message to the customer using the first contact information.

15. The system as recited in claim 14, the operations further comprising:

generating, based at least in part on determining that the message is not sent from the second merchant, third contact information for the customer, wherein the third contact information is different than the second contact information;

creating a fourth association between the third contact information and the first contact information; and sending, to the electronic device, the third contact information for facilitating communication between the customer and a third merchant associated with the electronic device.

16. The system as recited in claim 12, wherein receiving the first contact information includes receiving, from a device associated with the customer, the first contact information.

17. The system as recited in claim 12, wherein the first contact information includes a first email address and the second contact information includes a second email address.

18. The system as recited in claim 17, wherein the second email address is a proxy email address that obfuscates the first contact information.

19. The system as recited in claim 12, wherein the merchant device comprises a point-of-sale (POS) device.

20. The system as recited in claim 19, wherein receiving the payment information comprises receiving a request to process the transaction, wherein the request to process comprises the payment information.

* * * * *